US012462816B2

(12) United States Patent
Xia et al.

(10) Patent No.: US 12,462,816 B2
(45) Date of Patent: *Nov. 4, 2025

(54) AUDIO ENCODING METHOD AND CODING DEVICE

(71) Applicant: HUAWEI TECHNOLOGIES CO., LTD., Shenzhen (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

This patent is subject to a terminal disclaimer.

(21) Appl. No.: 18/146,616

(22) Filed: Dec. 27, 2022

(65) Prior Publication Data

US 2023/0138871 A1 May 4, 2023

Related U.S. Application Data

(63) Continuation of application No. PCT/CN2021/104087, filed on Jul. 1, 2021.

(30) Foreign Application Priority Data

Jul. 3, 2020 (CN) ........................ 202010632030.X

(51) Int. Cl.
*G10L 19/008* (2013.01)
*G10L 19/02* (2013.01)
*G10L 21/038* (2013.01)

(52) U.S. Cl.
CPC ............ *G10L 19/008* (2013.01); *G10L 19/02* (2013.01)

(58) Field of Classification Search
None
See application file for complete search history.

(56) References Cited

U.S. PATENT DOCUMENTS

2015/0162010 A1* 6/2015 Ishikawa ................ G10L 19/00 704/500
2015/0228288 A1 8/2015 Subasingha et al.
2015/0332688 A1* 11/2015 Liu ........................ G10L 19/02 704/500

(Continued)

FOREIGN PATENT DOCUMENTS

CN 101620854 A 1/2010
CN 101662288 A 3/2010

(Continued)

*Primary Examiner* — Ahmad F. Matar

(57) ABSTRACT

This application provides an audio encoding method and an encoding device. The method includes: obtaining a current frame includes a high frequency band signal and a low frequency band signal; performing first encoding on the high frequency band signal and the low frequency band signal, to obtain a first encoding parameter; performing second encoding on the high frequency band signal to obtain a second encoding parameter which indicates information about a tonal component of the high frequency band signal; adjusting, based on the information, a spectrum of a high frequency band signal obtained through bandwidth extension, to obtain an adjusted spectrum of the high frequency band signal; performing third encoding based on the adjusted spectrum of the high frequency band signal to obtain a third encoding parameter.

21 Claims, 9 Drawing Sheets

(56) References Cited

U.S. PATENT DOCUMENTS

| | | | | |
|---|---|---|---|---|
| 2016/0240207 | A1 | 8/2016 | Choo | |
| 2023/0040515 | A1* | 2/2023 | Xia | G10L 21/038 |
| 2023/0105508 | A1* | 4/2023 | Xia | G10L 19/0204<br>704/500 |

FOREIGN PATENT DOCUMENTS

| | | | |
|---|---|---|---|
| CN | 103971694 | A | 8/2014 |
| CN | 104103276 | A | 10/2014 |
| CN | 104584124 | A | 4/2015 |

* cited by examiner

700

AUDIO ENCODING METHOD AND CODING DEVICE

CROSS-REFERENCE TO RELATED APPLICATIONS

This application is a continuation of International Application No. PCT/CN2021/104087, filed on Jul. 1, 2021, which claims priority to Chinese Patent Application No. 202010632030.X, filed on Jul. 3, 2020. The disclosures of the aforementioned applications are hereby incorporated by reference in their entireties.

TECHNICAL FIELD

This application relates to the multimedia field, and more specifically, to an audio encoding method and a coding device.

BACKGROUND

To reduce a coding bit rate, an audio codec usually further performs coding through correlation between signals in different frequency bands. A basic principle of the audio codec is to code a high frequency band signal based on a low frequency band signal and by using a method such as spectral band replication or bandwidth extension, to code the high frequency band signal by using a small quantity of bits, thereby reducing a coding bit rate of an encoder. However, in a real audio signal, a spectrum of a high frequency band usually has some tonal components that are not similar to tonal components of a spectrum of a low frequency band. Due to a limitation of a quantity of coding bits, when information about a tonal component in the high frequency band signal is coded, how to determine a tonal component that needs to be coded and efficiently use a limited quantity of coding bits to obtain better coding effect becomes one of key technologies that affect coding quality.

SUMMARY

This application provides an audio encoding method and a coding device. In the audio encoding method, when high frequency band signal encoding includes bandwidth extension encoding and tonal component encoding, a limited quantity of coding bits may be used to obtain better encoding effect.

According to a first aspect, an audio encoding method is provided. The method includes: obtaining a current frame of an audio signal, where the current frame of the audio signal includes a high frequency band signal and a low frequency band signal; performing first encoding based on the high frequency band signal and the low frequency band signal, to obtain a first encoding parameter of the current frame of the audio signal, where the first encoding includes bandwidth extension encoding; performing second encoding based on the high frequency band signal to obtain a second encoding parameter of the current frame, where the second encoding parameter indicates information about a tonal component of the high frequency band signal; adjusting, based on the information about the tonal component of the high frequency band signal, a spectrum of a high frequency band signal obtained through bandwidth extension processing, to obtain an adjusted spectrum of the high frequency band signal, where the spectrum of the high frequency band signal obtained through bandwidth extension processing is obtained in a bandwidth extension encoding process; performing third encoding based on the adjusted spectrum of the high frequency band signal to obtain a third encoding parameter; and performing bitstream multiplexing on the first encoding parameter, the second encoding parameter, and the third encoding parameter to obtain an encoded bitstream of the current frame of the audio signal.

Therefore, in the audio encoding method in this embodiment of this application, the spectrum of the high frequency band signal obtained through bandwidth extension processing is adjusted based on the information about the tonal component of the high frequency band signal, to obtain the adjusted spectrum of the high frequency band signal in a current tile, and then the third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

With reference to the first aspect, in some implementations of the first aspect, the information about the tonal component includes one or more of the following parameters: flag information of the tonal component, location information of the tonal component, quantity information of the tonal component, amplitude information of the tonal component, or energy information of the tonal component.

With reference to the first aspect, in some implementations of the first aspect, a high frequency band corresponding to the high frequency band signal includes at least one tile, and the at least one tile includes a current tile. The adjusting, based on the information about the tonal component of the high frequency band signal, a spectrum of a high frequency band signal obtained through bandwidth extension processing, to obtain an adjusted spectrum of the high frequency band signal includes: adjusting, based on quantity information of a tonal component in the current tile, a spectrum of a high frequency band signal obtained through bandwidth extension processing in the current tile, to obtain an adjusted spectrum of the high frequency band signal in the current tile.

Therefore, in the audio encoding method in this embodiment of this application, the spectrum of the high frequency band signal obtained through bandwidth extension processing is adjusted based on the quantity information of the tonal component of the high frequency band signal, to obtain the adjusted spectrum of the high frequency band signal in the current tile, and then the third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

With reference to the first aspect, in some implementations of the first aspect, the adjusting, based on quantity information of a tonal component in the current tile, a spectrum of a high frequency band signal obtained through bandwidth extension processing in the current tile, to obtain an adjusted spectrum of the high frequency band signal in the current tile includes: if the quantity information of the tonal component in the current tile meets a first preset condition, adjusting the spectrum of the high frequency band signal obtained through bandwidth extension processing in the current tile, to obtain the adjusted spectrum of the high frequency band signal in the current tile.

With reference to the first aspect, in some implementations of the first aspect, the first preset condition is that a quantity of tonal components in the current tile is greater than or equal to a first threshold.

With reference to the first aspect, in some implementations of the first aspect, a high frequency band corresponding to the high frequency band signal includes at least one tile, and the at least one tile includes a current tile. The adjusting, based on the information about the tonal component of the high frequency band signal, a spectrum of a high frequency band signal obtained through bandwidth extension processing, to obtain an adjusted spectrum of the high frequency band signal includes: adjusting, based on flag information of a tonal component in the current tile, a spectrum of a high frequency band signal obtained through bandwidth extension processing in the current tile, to obtain an adjusted spectrum of the high frequency band signal in the current tile, where the flag information of the tonal component indicates whether the tonal component exists in the current tile.

Therefore, in the audio encoding method in this embodiment of this application, the spectrum of the high frequency band signal obtained through bandwidth extension processing is adjusted based on the flag information of the tonal component of the high frequency band signal, to obtain the adjusted spectrum of the high frequency band signal in the current tile, and then the third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

With reference to the first aspect, in some implementations of the first aspect, the adjusting, based on flag information of a tonal component in the current tile, a spectrum of a high frequency band signal obtained through bandwidth extension processing in the current tile, to obtain an adjusted spectrum of the high frequency band signal in the current tile includes: if a value of the flag information of the tonal component in the current tile is a first preset value, adjusting the spectrum of the high frequency band signal obtained through bandwidth extension processing in the current tile, to obtain the adjusted spectrum of the high frequency band signal in the current tile. The value of the flag information of the tonal component in the current tile equal to the first preset value indicates that the tonal component exists in the current tile.

With reference to the first aspect, in some implementations of the first aspect, the adjusting the spectrum of the high frequency band signal obtained through bandwidth extension processing in the current tile, to obtain the adjusted spectrum of the high frequency band signal in the current tile includes: setting a value of the spectrum of the high frequency band signal obtained through bandwidth extension processing in the current tile to a second preset value, to obtain the adjusted spectrum of the high frequency band signal in the current tile; or weighting the spectrum of the high frequency band signal obtained through bandwidth extension processing in the current tile, to obtain the adjusted spectrum of the high frequency band signal in the current tile.

With reference to the first aspect, in some implementations of the first aspect, a high frequency band corresponding to the high frequency band signal includes at least one tile, and the at least one tile includes a current tile. The adjusting, based on the information about the tonal component of the high frequency band signal, a spectrum of a high frequency band signal obtained through bandwidth extension processing, to obtain an adjusted spectrum of the high frequency band signal includes: adjusting, based on location information of a tonal component in the current tile, a spectrum of a high frequency band signal obtained through bandwidth extension processing in the current tile, to obtain an adjusted spectrum of the high frequency band signal in the current tile.

Therefore, in the audio encoding method in this embodiment of this application, the spectrum of the high frequency band signal obtained through bandwidth extension processing is adjusted based on the location information of the tonal component of the high frequency band signal, to obtain the adjusted spectrum of the high frequency band signal in the current tile, and then the third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

With reference to the first aspect, in some implementations of the first aspect, the current tile includes at least one subband, and the at least one subband includes a current subband. The adjusting, based on location information of a tonal component in the current tile, a spectrum of a high frequency band signal obtained through bandwidth extension processing in the current tile, to obtain an adjusted spectrum of the high frequency band signal in the current tile includes: if the location information of the tonal component in the current tile meets a second preset condition, adjusting a spectrum of a high frequency band signal obtained through bandwidth extension processing in the current subband, to obtain an adjusted spectrum of the high frequency band signal in the current subband.

In this case, adjusting the spectrum of the high frequency band signal obtained through bandwidth extension processing based on the location information of the tonal component of the high frequency band signal may implement adjustment only on the current subband corresponding to the tonal component, to avoid adjustment on another subband of a high frequency band, and reduce impact on the another subband of the high frequency band. This can implement fine adjustment, and reduce computing resources of a coding device.

With reference to the first aspect, in some implementations of the first aspect, the location information of the tonal component in the current tile includes an index of a subband including the tonal component in the current tile, and the second preset condition is that the index of the subband including the tonal component includes an index of the current subband.

With reference to the first aspect, in some implementations of the first aspect, the adjusting a spectrum of a high frequency band signal obtained through bandwidth extension processing in the current subband, to obtain an adjusted spectrum of the high frequency band signal in the current subband includes:

setting a value of the spectrum of the high frequency band signal obtained through bandwidth extension processing in the current subband to a second preset value, to obtain the adjusted spectrum of the high frequency band signal in the current tile; or weighting the spectrum of the high frequency band signal obtained through bandwidth extension processing in the current subband, to obtain the adjusted spectrum of the high frequency band signal in the current subband.

With reference to the first aspect, in some implementations of the first aspect, before the adjusting, based on the information about the tonal component of the high frequency band signal, a spectrum of a high frequency band signal obtained through bandwidth extension processing, to obtain an adjusted spectrum of the high frequency band signal, the method further includes: determining a start tile based on an encoding rate of the current frame, where the start tile is a tile with a smallest index in a frequency range in which whether to adjust the spectrum of the high frequency band signal obtained through bandwidth extension processing needs to be determined. The adjusting, based on the information about the tonal component of the high frequency band signal, a spectrum of a high frequency band signal obtained through bandwidth extension processing, to obtain an adjusted spectrum of the high frequency band signal includes: adjusting, based on the information about the tonal component of the high frequency band signal from the start tile, the spectrum of the high frequency band signal obtained through bandwidth extension processing, to obtain the adjusted spectrum of the high frequency band signal.

With reference to the first aspect, in some implementations of the first aspect, the determining a start tile based on an encoding rate of the current frame includes: if the encoding rate of the current frame meets a third preset condition, the start tile is a first start tile; or if the encoding rate of the current frame does not meet a third preset condition, the start tile is a second start tile, where a frequency range corresponding to the first start tile is different from a frequency range corresponding to the second start tile.

With reference to the first aspect, in some implementations of the first aspect, before the adjusting, based on the information about the tonal component of the high frequency band signal, a spectrum of a high frequency band signal obtained through bandwidth extension processing, to obtain an adjusted spectrum of the high frequency band signal, the method further includes: determining a first tile range based on an encoding rate of the current frame, where the first tile range is a range of a tile in which whether to adjust the spectrum of the high frequency band signal obtained through bandwidth extension processing needs to be determined. The adjusting, based on the information about the tonal component of the high frequency band signal, a spectrum of a high frequency band signal obtained through bandwidth extension processing, to obtain an adjusted spectrum of the high frequency band signal includes: adjusting, in the first tile range based on the information about the tonal component of the high frequency band signal, the spectrum of the high frequency band signal obtained through bandwidth extension processing, to obtain the adjusted spectrum of the high frequency band signal.

With reference to the first aspect, in some implementations of the first aspect, the determining a first tile range based on an encoding rate of the current frame includes: if the encoding rate of the current frame meets a third preset condition, the first tile range is a first range; or if the encoding rate of the current frame does not meet a third preset condition, the first tile range is a second range, where a frequency range corresponding to the first range is not completely the same as a frequency range corresponding to the second range.

With reference to the first aspect, in some implementations of the first aspect, the high frequency band corresponding to the high frequency band signal includes the at least one tile, and the at least one tile includes the current tile. Before the adjusting, based on the information about the tonal component of the high frequency band signal, a spectrum of a high frequency band signal obtained through bandwidth extension processing, to obtain an adjusted spectrum of the high frequency band signal, the method further includes: determining whether the current tile belongs to a first tile range based on the spectrum of the high frequency band signal obtained through bandwidth extension processing in the current tile, where the first tile range is a range of a tile in which whether to adjust the spectrum of the high frequency band signal obtained through bandwidth extension processing needs to be determined; and if the current tile belongs to the first tile range, the adjusting, based on the information about the tonal component of the high frequency band signal, a spectrum of a high frequency band signal obtained through bandwidth extension processing, to obtain an adjusted spectrum of the high frequency band signal includes: adjusting the spectrum of the high frequency band signal in the current tile based on the information about the tonal component of the high frequency band signal, to obtain the adjusted spectrum of the high frequency band signal in the current tile.

With reference to the first aspect, in some implementations of the first aspect, in the spectrum of the high frequency band signal obtained through bandwidth extension processing in the current tile, if a quantity of frequency bins whose absolute values of spectrum values are greater than a second threshold and less than a third threshold, the current tile belongs to the first tile range.

Therefore, before the spectrum of the high frequency band signal obtained through bandwidth extension processing is adjusted, based on the encoding rate of the current frame or the spectrum obtained through bandwidth extension in the current frame, the range of the tile in which whether to perform spectrum adjustment in the current frame needs to be determined is determined. This improves encoding efficiency.

According to a second aspect, a coding device is provided. The coding device includes: an obtaining unit, configured to obtain a current frame of an audio signal, where the current frame of the audio signal includes a high frequency band signal and a low frequency band signal; and a processing unit, configured to perform first encoding based on the high frequency band signal and the low frequency band signal, to obtain a first encoding parameter of the current frame of the audio signal, where the first encoding includes bandwidth extension encoding. The processing unit is further configured to perform second encoding based on the high frequency band signal to obtain a second encoding parameter of the current frame, where the second encoding parameter indicates information about a tonal component of the high frequency band signal. The processing unit is further configured to adjust, based on the information about the tonal component of the high frequency band signal, a spectrum of a high frequency band signal obtained through bandwidth extension processing, to obtain an adjusted spectrum of the high frequency band signal, where the spectrum of the high frequency band signal obtained through bandwidth extension processing is obtained in a bandwidth extension encoding process. The processing unit is further configured to perform third encoding based on the adjusted spectrum of the high frequency band signal to obtain a third encoding parameter. The processing unit is further configured to perform bitstream multiplexing on the first encoding parameter, the second encoding parameter, and the third encoding parameter to obtain an encoded bitstream of the current frame of the audio signal.

With reference to the second aspect, in some implementations of the second aspect, the information about the tonal component includes one or more of the following parameters: flag information of the tonal component, location information of the tonal component, quantity information of the tonal component, amplitude information of the tonal component, or energy information of the tonal component.

With reference to the second aspect, in some implementations of the second aspect, a high frequency band corresponding to the high frequency band signal includes at least one tile, and the at least one tile includes a current tile. The processing unit is specifically configured to: adjust, based on quantity information of a tonal component in the current tile, a spectrum of a high frequency band signal obtained through bandwidth extension processing in the current tile, to obtain an adjusted spectrum of the high frequency band signal in the current tile.

With reference to the second aspect, in some implementations of the second aspect, the processing unit is specifically configured to: if the quantity information of the tonal component in the current tile meets a first preset condition, adjust the spectrum of the high frequency band signal obtained through bandwidth extension processing in the current tile, to obtain the adjusted spectrum of the high frequency band signal in the current tile.

With reference to the second aspect, in some implementations of the second aspect, the first preset condition is that a quantity of tonal components in the current tile is greater than or equal to a first threshold.

With reference to the second aspect, in some implementations of the second aspect, a high frequency band corresponding to the high frequency band signal includes at least one tile, and the at least one tile includes a current tile. The processing unit is specifically configured to: adjust, based on flag information of a tonal component in the current tile, a spectrum of a high frequency band signal obtained through bandwidth extension processing in the current tile, to obtain an adjusted spectrum of the high frequency band signal in the current tile, where the flag information of the tonal component indicates whether the tonal component exists in the current tile.

With reference to the second aspect, in some implementations of the second aspect, the processing unit is specifically configured to: if a value of the flag information of the tonal component in the current tile is a first preset value, adjust the spectrum of the high frequency band signal obtained through bandwidth extension processing in the current tile, to obtain the adjusted spectrum of the high frequency band signal in the current tile. The value of the flag information of the tonal component in the current tile equal to the first preset value indicates that the tonal component exists in the current tile.

With reference to the second aspect, in some implementations of the second aspect, the processing unit is specifically configured to: set a value of the spectrum of the high frequency band signal obtained through bandwidth extension processing in the current tile to a second preset value, to obtain the adjusted spectrum of the high frequency band signal in the current tile; or weight the spectrum of the high frequency band signal obtained through bandwidth extension processing in the current tile, to obtain the adjusted spectrum of the high frequency band signal in the current tile.

With reference to the second aspect, in some implementations of the second aspect, a high frequency band corresponding to the high frequency band signal includes at least one tile, and the at least one tile includes a current tile. The processing unit is specifically configured to:

adjust, based on location information of a tonal component in the current tile, a spectrum of a high frequency band signal obtained through bandwidth extension processing in the current tile, to obtain an adjusted spectrum of the high frequency band signal in the current tile.

With reference to the second aspect, in some implementations of the second aspect, the current tile includes at least one subband, and the at least one subband includes a current subband. The processing unit is specifically configured to: if the location information of the tonal component in the current tile meets a second preset condition, adjust a spectrum of a high frequency band signal obtained through bandwidth extension processing in the current subband, to obtain an adjusted spectrum of the high frequency band signal in the current subband.

With reference to the second aspect, in some implementations of the second aspect, the location information of the tonal component in the current tile includes an index of a subband including the tonal component in the current tile, and the second preset condition is that the index of the subband including the tonal component includes an index of the current subband.

With reference to the second aspect, in some implementations of the second aspect, the processing unit is specifically configured to: set a value of the spectrum of the high frequency band signal obtained through bandwidth extension processing in the current subband to a second preset value, to obtain the adjusted spectrum of the high frequency band signal in the current tile; or weight the spectrum of the high frequency band signal obtained through bandwidth extension processing in the current subband, to obtain the adjusted spectrum of the high frequency band signal in the current subband.

With reference to the second aspect, in some implementations of the second aspect, the processing unit is further configured to: before adjusting, based on the information about the tonal component of the high frequency band signal, the spectrum of the high frequency band signal obtained through bandwidth extension processing, to obtain the adjusted spectrum of the high frequency band signal, determine a start tile based on an encoding rate of the current frame, where the start tile is a tile with a smallest index in a frequency range in which whether to adjust the spectrum of the high frequency band signal obtained through bandwidth extension processing needs to be determined. The adjusting, based on the information about the tonal component of the high frequency band signal, a spectrum of a high frequency band signal obtained through bandwidth extension processing, to obtain an adjusted spectrum of the high frequency band signal includes: adjusting, based on the information about the tonal component of the high frequency band signal from the start tile, the spectrum of the high frequency band signal obtained through bandwidth extension processing, to obtain the adjusted spectrum of the high frequency band signal.

With reference to the second aspect, in some implementations of the second aspect, the processing unit is specifically configured to: if the encoding rate of the current frame meets a third preset condition, the start tile is a first start tile; or if the encoding rate of the current frame does not meet a third preset condition, the start tile is a second start tile, where a frequency range corresponding to the first start tile is different from a frequency range corresponding to the second start tile.

With reference to the second aspect, in some implementations of the second aspect, the processing unit is further configured to: before adjusting, based on the information about the tonal component of the high frequency band signal, the spectrum of the high frequency band signal obtained through bandwidth extension processing, to obtain the adjusted spectrum of the high frequency band signal, determine a first tile range based on an encoding rate of the current frame, where the first tile range is a range of a tile in which whether to adjust the spectrum of the high frequency band signal obtained through bandwidth extension processing needs to be determined. The adjusting, based on the information about the tonal component of the high frequency band signal, a spectrum of a high frequency band signal obtained through bandwidth extension processing, to obtain an adjusted spectrum of the high frequency band signal includes: adjusting, in the first tile range based on the information about the tonal component of the high frequency band signal, the spectrum of the high frequency band signal obtained through bandwidth extension processing, to obtain the adjusted spectrum of the high frequency band signal.

With reference to the second aspect, in some implementations of the second aspect, the processing unit is specifically configured to: if the encoding rate of the current frame meets a third preset condition, the first tile range is a first range; or if the encoding rate of the current frame does not meet a third preset condition, the first tile range is a second range, where a frequency range corresponding to the first range is not completely the same as a frequency range corresponding to the second range.

With reference to the second aspect, in some implementations of the second aspect, the high frequency band corresponding to the high frequency band signal includes the at least one tile, and the at least one tile includes the current tile. The processing unit is further configured to:

before adjusting, based on the information about the tonal component of the high frequency band signal, the spectrum of the high frequency band signal obtained through bandwidth extension processing, to obtain the adjusted spectrum of the high frequency band signal, determine whether the current tile belongs to a first tile range based on the spectrum of the high frequency band signal obtained through bandwidth extension processing in the current tile, where the first tile range is a range of a tile in which whether to adjust the spectrum of the high frequency band signal obtained through bandwidth extension processing needs to be determined. The processing unit is further configured to: if the current tile belongs to the first tile range, adjust the spectrum of the high frequency band signal in the current tile based on the information about the tonal component of the high frequency band signal, to obtain the adjusted spectrum of the high frequency band signal in the current tile.

With reference to the second aspect, in some implementations of the second aspect, the processing unit is specifically configured to: in the spectrum of the high frequency band signal obtained through bandwidth extension processing in the current tile, if a quantity of frequency bins whose absolute values of spectrum values are greater than a second threshold and less than a third threshold, the current tile belongs to the first tile range.

According to a third aspect, a communication apparatus is provided, including a processor. The processor is connected to a memory, and the memory is configured to store a computer program. The processor is configured to execute the computer program stored in the memory, so that the apparatus performs the method according to any one of the first aspect or the possible implementations of the first aspect.

According to a fourth aspect, a computer-readable storage medium is provided, where the computer-readable storage medium stores a computer program. When the computer program is run, the method according to any one of the first aspect or the possible implementations of the first aspect is implemented.

According to a fifth aspect, a chip is provided, including a processor and an interface. The processor is configured to read instructions to perform the method according to any one of the first aspect or the possible implementations of the first aspect.

Optionally, the chip may further include a memory. The memory stores instructions. The processor is configured to execute the instructions stored in the memory or other instructions.

According to a sixth aspect, a computer-readable storage medium is provided, where the computer-readable storage medium stores an encoded bitstream obtained according to the method according to any one of the first aspect or the possible implementations of the first aspect.

DESCRIPTION OF EMBODIMENTS

The following describes technical solutions of this application with reference to accompanying drawings.

Embodiments of this application may be applied to a stereo codec in a communication module of a terminal device, a radio access network device, or a core network device.

Figure 1:
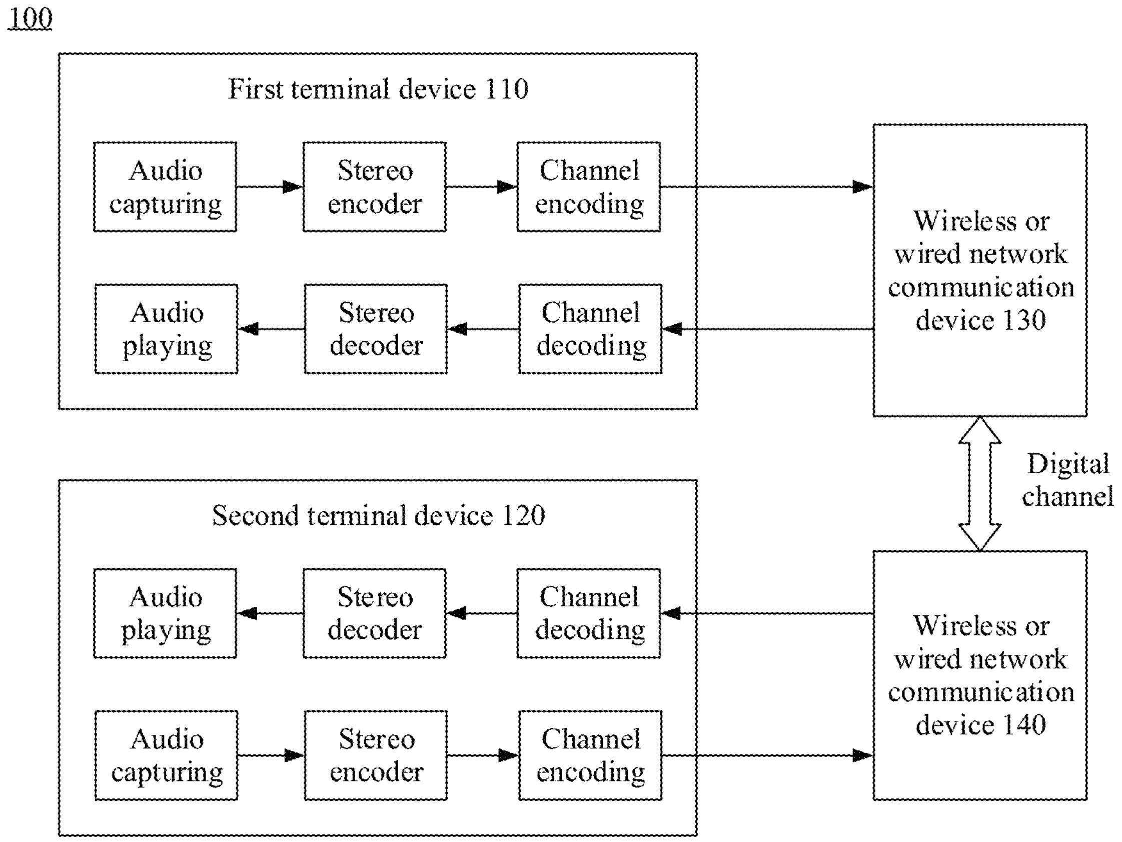
FIG. 1 is a schematic diagram of an application scenario according to an embodiment of this application.

The following describes an application scenario in embodiments of this application. FIG. 1 is a schematic diagram of an application scenario 100 according to an embodiment of this application. FIG. 1 is a schematic diagram of a system architecture applied to a terminal device side according to an embodiment of this application. As shown in FIG. 1, FIG. 1 includes a first terminal device 110, a second terminal device 120, a wireless or wired network communication device 130, and a wireless or wired network communication device 140. The first terminal device 110 and the second terminal device 120 may be transmit end devices, or may be receive end devices. An example in which the first terminal device 110 is a transmit end device and the second terminal device 120 is a receive end device is used for description. In audio communication, an audio capturing module in the first terminal device 110 is configured to capture audio, a stereo encoder performs stereo encoding on a captured stereo signal, a channel encoding module performs channel encoding to obtain a bitstream, and then a signal is transmitted on a digital channel by using the wireless or wired network communication device 130 at a transmit end. The wireless or wired network communication device 140 at a receive end obtains, through the digital channel, the signal sent by the first terminal device 110, and transmits the signal to the second terminal device 120. The second terminal device 120 performs channel decoding in a channel decoding module based on the received signal, decodes the stereo signal by using a stereo decoder, and then performs audio playing in an audio playing module based on the decoded stereo signal. It should be understood that, when the second terminal device 120 is a transmit end device and the first terminal device 110 is a receive end device, it may be understood with reference to a case in which the first terminal device 110 is a transmit end device and the second terminal device 120 is a receive end device. Details are not described herein again.

It should be understood that the wireless or wired network communication device 130 and the wireless or wired network communication device 140 may alternatively be core network devices.

Figure 2:
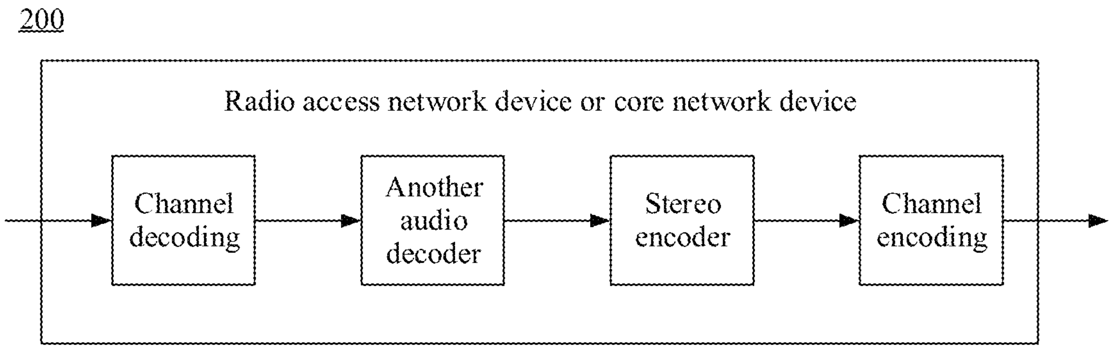
FIG. 2 is a schematic diagram of an application scenario according to an embodiment of this application.

FIG. 2 is a schematic diagram of another application scenario 200 according to an embodiment of this application. FIG. 2 is a schematic diagram of a system architecture applied to a radio access network device or a core network device for transcoding according to an embodiment of this application. As shown in FIG. 2, the radio access network device or the core network device in FIG. 2 includes a channel decoding module, another audio decoder, a stereo encoder, and a channel encoding module. During transcoding, corresponding stereo coding processing needs to be performed. The radio access network device or the core network device performs channel decoding on a received signal in the channel decoding module, and then decodes an audio bitstream by using the another audio decoder, to obtain the audio bitstream. The stereo encoder re-encodes the audio bitstream, and then performs channel encoding to transmit an audio signal.

Figure 3:
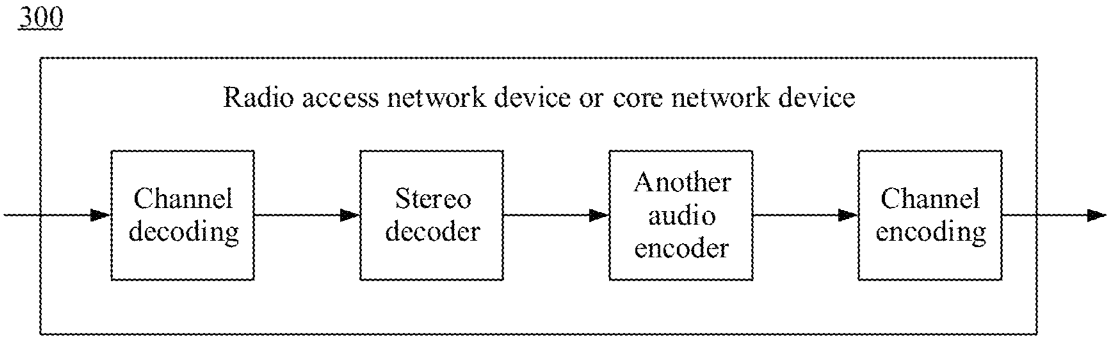
FIG. 3 is a schematic diagram of an application scenario according to an embodiment of this application.

FIG. 3 is a schematic diagram of another application scenario 300 according to an embodiment of this application. FIG. 3 is a schematic diagram of a system architecture applied to a radio access network device or a core network device for transcoding according to an embodiment of this application. As shown in FIG. 3, the radio access network device or the core network device in FIG. 3 includes a channel decoding module, a stereo decoder, another audio encoder, and a channel encoding module. During transcoding, corresponding stereo coding processing needs to be performed. The radio access network device or the core network device performs channel decoding on a received signal in the channel decoding module, and then decodes an audio bitstream by using the stereo decoder, to obtain the audio bitstream. The another audio encoder re-encodes the audio bitstream, and then performs channel encoding to transmit an audio signal.

Stereo coding processing may be a part of a multi-channel codec. For example, performing multi-channel encoding on a captured multi-channel signal may be: performing downmixing processing on the captured multi-channel signal to obtain a stereo signal, and encoding the obtained stereo signal. A decoder side decodes a bitstream based on the stereo signal to obtain the stereo signal, and performing upmixing processing on the stereo signal to restore the multi-channel signal. Therefore, embodiments of this application may also be applied to a multi-channel codec in the communication module of the terminal device, the radio access network device, or the core network device.

Figure 4:
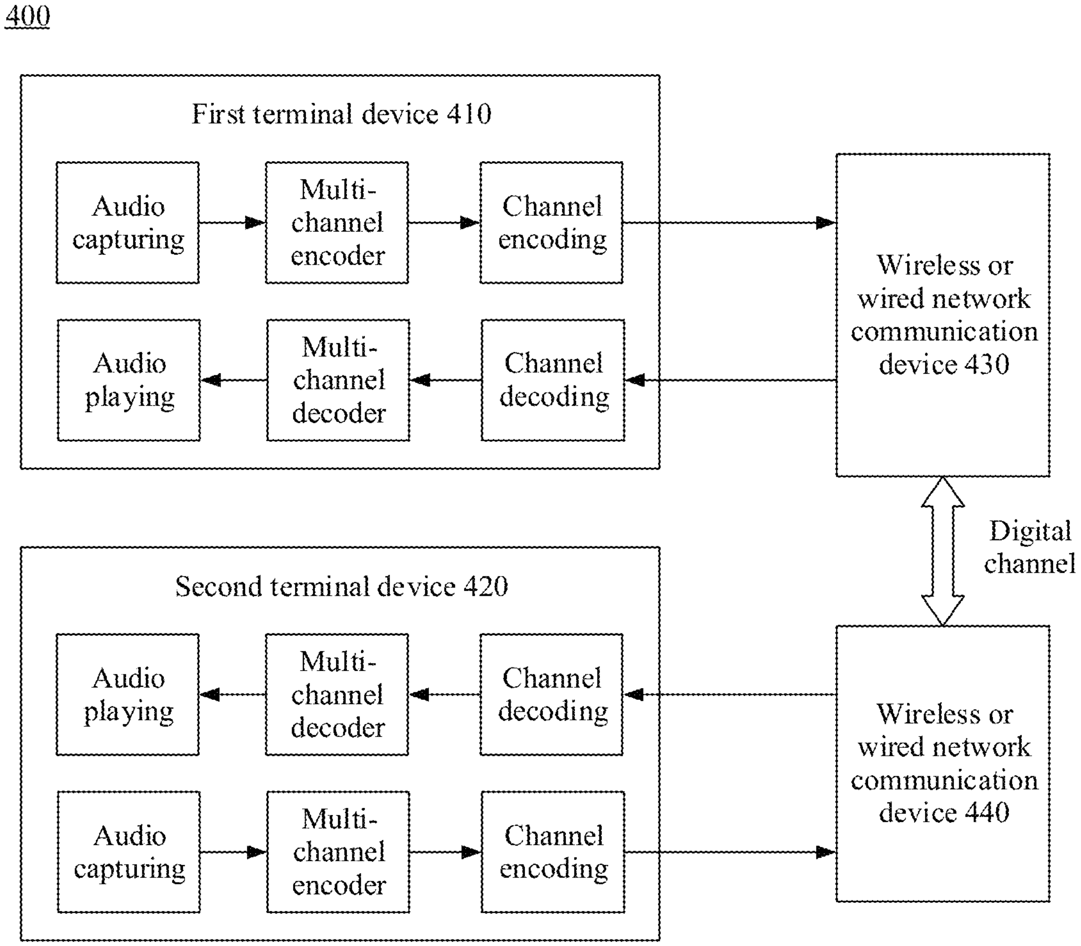
FIG. 4 is a schematic diagram of an application scenario according to an embodiment of this application.

FIG. 4 is a schematic diagram of an application scenario 400 according to an embodiment of this application. FIG. 4 is a schematic diagram of a system architecture applied to a terminal device side according to an embodiment of this application. As shown in FIG. 4, FIG. 4 includes a first terminal device 410, a second terminal device 420, a wireless or wired network communication device 430, and a wireless or wired network communication device 440. The first terminal device 410 and the second terminal device 420 may be transmit end devices, or may be receive end devices. An example in which the first terminal device 410 is a transmit end device and the second terminal device 420 is a receive end device is used for description. In audio communication, an audio capturing module in the first terminal device 410 is configured to capture audio, a multi-channel encoder performs multi-channel encoding on a captured stereo signal, a channel encoding module performs channel encoding to obtain a bitstream, and then a signal is transmitted on a digital channel by using the wireless or wired network communication device 430 at a transmit end. The wireless or wired network communication device 440 at a receive end obtains, through the digital channel, the signal sent by the first terminal device 410, and transmits the signal to the second terminal device 420. The second terminal device 420 performs channel decoding in a channel decoding module based on the received signal, decodes the multi-channel signal by using a multi-channel decoder, and then performs audio playing in an audio playing module based on the decoded multi-channel signal. It should be understood that, when the second terminal device 420 is a transmit end device and the first terminal device 410 is a receive end device, it may be understood with reference to a case in which the first terminal device 410 is a transmit end device and the second terminal device 420 is a receive end device. Details are not described herein again.

It should be understood that the wireless or wired network communication device 430 and the wireless or wired network communication device 440 may alternatively be core network devices.

Figure 5:
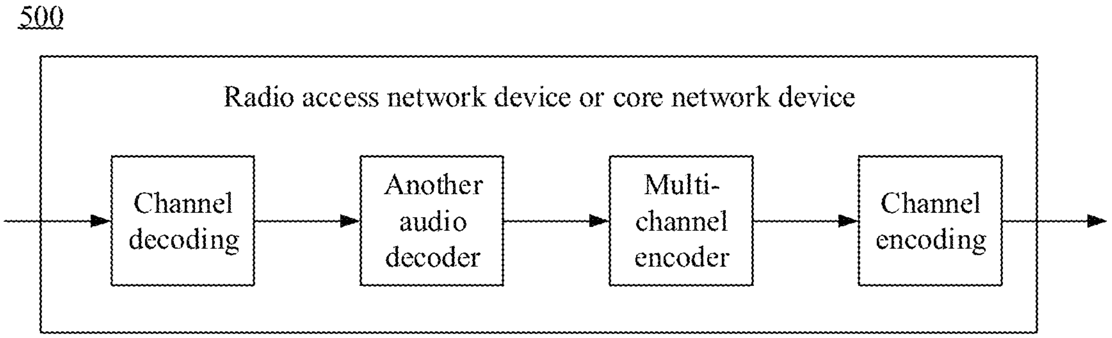
FIG. 5 is a schematic diagram of an application scenario according to an embodiment of this application.

FIG. 5 is a schematic diagram of another application scenario 500 according to an embodiment of this application. FIG. 5 is a schematic diagram of a system architecture applied to a radio access network device or a core network device for transcoding according to an embodiment of this application. As shown in FIG. 5, the radio access network device or the core network device in FIG. 5 includes a channel decoding module, another audio decoder, a multi-channel encoder, and a channel encoding module. During transcoding, corresponding multi-channel coding processing needs to be performed. The radio access network device or the core network device performs channel decoding on a received signal in the channel decoding module, and then decodes an audio bitstream by using the another audio decoder, to obtain the audio bitstream. The multi-channel encoder re-encodes the audio bitstream, and then performs channel encoding to transmit an audio signal.

Figure 6:
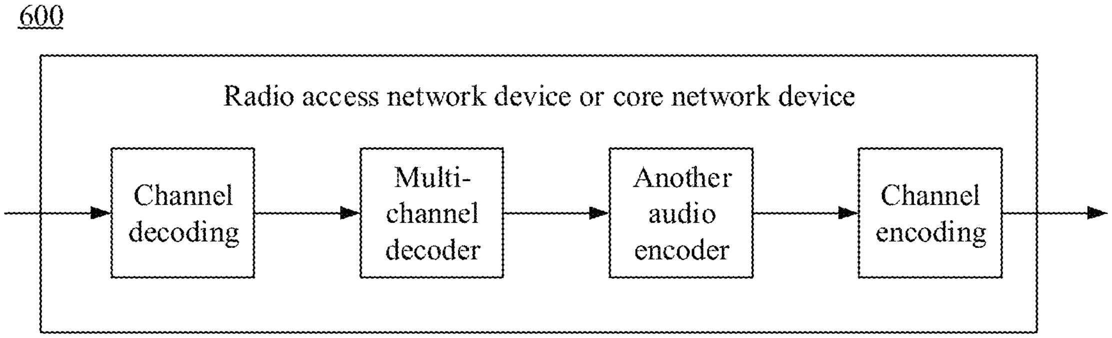
FIG. 6 is a schematic diagram of an application scenario according to an embodiment of this application.

FIG. 6 is a schematic diagram of another application scenario 600 according to an embodiment of this application. FIG. 6 is a schematic diagram of a system architecture applied to a radio access network device or a core network device for transcoding according to an embodiment of this application. As shown in FIG. 6, the radio access network device or the core network device in FIG. 6 includes a channel decoding module, a multi-channel decoder, another audio encoder, and a channel encoding module. During transcoding, corresponding multi-channel coding processing needs to be performed. The radio access network device or the core network device performs channel decoding on a received signal in the channel decoding module, and then decodes an audio bitstream by using the multi-channel decoder, to obtain the audio bitstream. The another audio encoder re-encodes the audio bitstream, and then performs channel encoding to transmit an audio signal.

Figure 7:
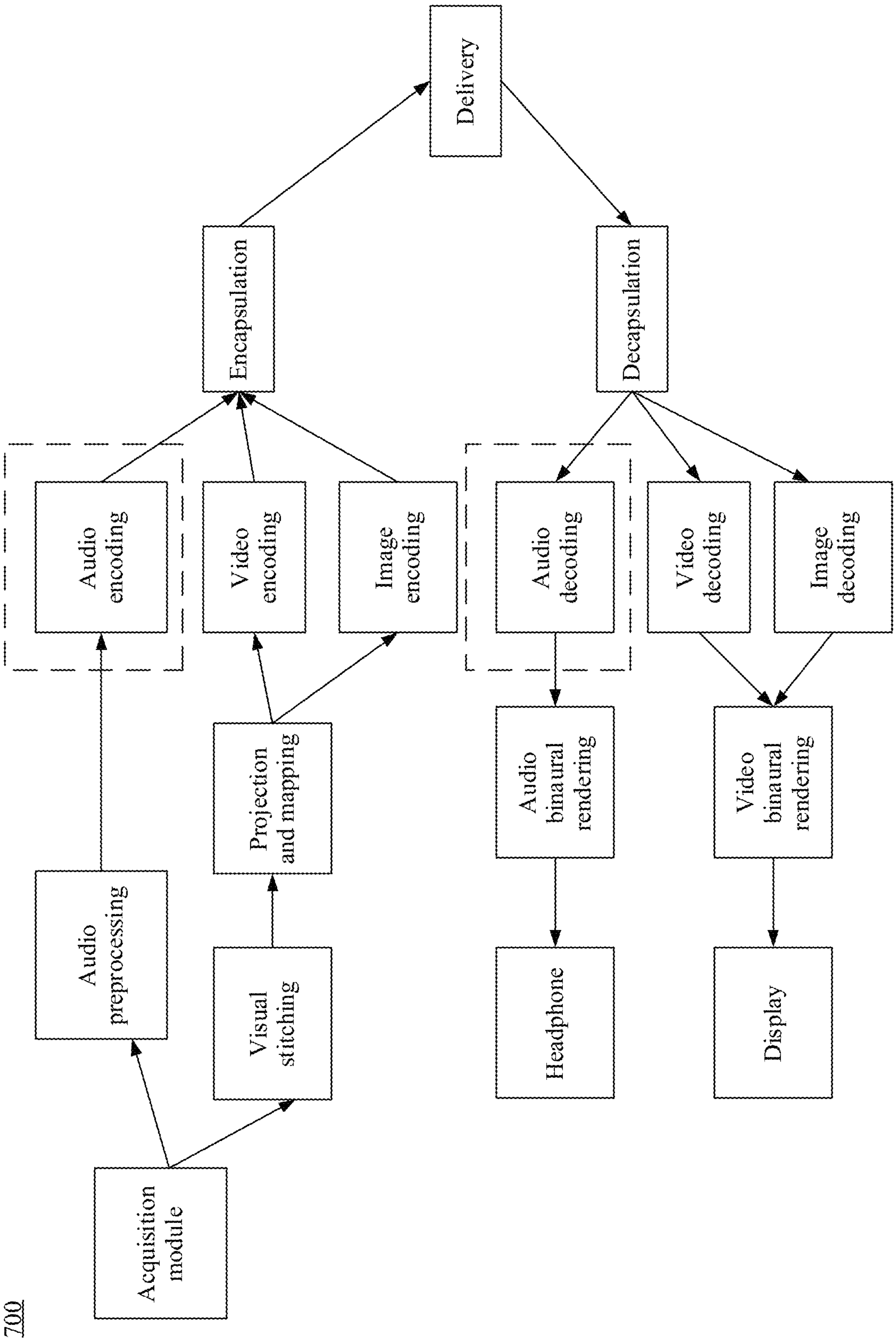
FIG. 7 is a schematic diagram of an application scenario according to an embodiment of this application.

Embodiments of this application may be further applied to an audio encoding module and an audio decoding module in a virtual reality (VR) streaming service. As shown in a dashed box in FIG. 7, FIG. 7 is a schematic diagram of another application scenario 700 according to an embodiment of this application. An end-to-end process of processing an audio signal is as follows: At a transmit end, an acquisition module processes the audio signal and a video signal and then classifies the audio signal and the video signal into the audio signal and the video signal. A preprocessing (Audio Preprocessing) operation is performed on the audio signal. The preprocessing operation includes filtering out a low frequency part in the audio signal, usually using 20 Hz or 50 Hz as a boundary point, extracting orientation information in the signal, and then performing audio encoding. After visual stitching and projection and mapping are performed on the video signal, video encoding and image encoding are performed. After encapsulation (file/segment encapsulation) is performed on an audio bitstream, a video bitstream, and an image bitstream, an encapsulated audio bitstream, an encapsulated video bitstream, and an encapsulated image bitstream are delivered (Delivery) to a decoder side. The decoder side performs decapsulation (File/Segment decapsulation), separately performs audio decoding, video decoding, and image decoding, and performs audio binaural rendering (Audio rendering) on the decoded audio signal. A signal obtained through the rendering processing is mapped to listener headphones. The headphone may be an independent headphone or a headphone on a glasses device such as an HTC VIVE. Video binaural rendering (video rendering) processing is performed on the decoded video signal and the decoded image signal, and a signal obtained through the rendering processing is mapped to a display.

The terminal device in embodiments of this application may also be referred to as user equipment (UE), a mobile station (MS), a mobile terminal (MT), an access terminal, a subscriber unit, a subscriber station, a mobile station, a mobile station, a remote station, a remote terminal, a mobile device, a user terminal, a terminal, a wireless communication device, a user agent, a user apparatus, or the like.

The terminal device may be a wireless terminal or a wired terminal. The wireless terminal may refer to a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, for example, a mobile phone (which is also referred to as a "cellular" phone) or a computer having a mobile terminal, for example, may be a portable, pocket-sized, handheld, computer built-in, or in-vehicle mobile apparatus, which exchanges a voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, user equipment (User Device or User Equipment), a mobile internet device (MID), a wearable device, a virtual reality (VR) device, an augmented reality (AR) device, a wireless terminal in industrial control, a wireless terminal in self driving, a wireless terminal in remote surgery (remote medical surgery), a wireless terminal in a smart grid, a wireless terminal in transportation safety, a wireless terminal in a smart city, a wireless terminal in a smart home, a vehicle-mounted device, a wearable device, a terminal device in a 5G network, a terminal device in a future evolved public land mobile network (PLMN), or the like. This is not limited in embodiments of this application.

By way of example, and not limitation, in embodiments of this application, the wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, such as smart watches or smart glasses, and devices that focus on only one type of application function and need to work with other devices such as smartphones, such as various smart bands or smart jewelry for monitoring physical signs.

In addition, in embodiments of this application, the terminal device may alternatively be a terminal device in an internet of things (IoT) system. IoT is an important part of future development of information technologies. A main technical feature of the IoT is connecting a thing to a network by using a communication technology, to implement an intelligent network for interconnection between a person and a machine or between things.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

In embodiments of this application, the terminal device may further include a relay (relay). Alternatively, it is understood that any device that can perform data communication with a base station may be considered as a terminal device.

The access network device in embodiments of this application may be a device for communicating with a terminal device, may be a base station, an access point, or a network device, or may be a device that communicates with a wireless terminal over an air interface in an access network by using one or more sectors. The network device may be configured to mutually convert a received over-the-air frame and an IP packet and serve as a router between the wireless terminal and a rest portion of the access network, where the rest portion of the access network may include an Internet protocol (IP) network. The network device may further coordinate attribute management of the air interface. For example, the access network device may be a base station (Base Transceiver Station, BTS) in a global system for mobile communication (GSM) or code division multiple access (CDMA), or may be a base station (NodeB, NB) in wideband code division multiple access (WCDMA), or may be an evolved NodeB (evolved NodeB, eNB or eNodeB) in an LTE system, or may be a radio controller in a cloud radio access network (CRAN) scenario. Alternatively, the access device may be a relay station, an access point, a vehicle-mounted device, a wearable device, an access device in a 5G network, a network device in a future evolved PLMN network, or the like, may be an access point (AP) in a WLAN, or may be a gNB in a new radio (NR) system. This is not limited in embodiments of this application. It should be noted that, in a 5G system, there may be one or more transmission reception points (TRP) on one base station. All TRPs belong to a same cell, and an audio encoding method described in embodiments of this application may be used for each of the TRPs and the terminal. In another scenario, the network device may be further divided into a control unit (CU) and a data unit (DU). There may be a plurality of DUs under one CU. The audio encoding method described in embodiments of this application may be used for each DU and the terminal. A difference between a CU-DU separation scenario and a multi-TRP scenario lies in that a TRP only serves as a radio frequency unit or an antenna device, but a DU may implement a protocol stack function, for example, the DU may implement a physical layer function.

In addition, in embodiments of this application, the access network device is a device in an access network (radio access network, RAN), or in other words, a RAN node that connects the terminal device to a wireless network. For example, by way of example, and not limitation, the access network device may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), or the like.

The access network device provides a service for a cell. The terminal device communicates with the access network device by using a transmission resource (for example, a frequency domain resource, or in other words, a spectrum resource) used for the cell. The cell may be a cell corresponding to the access network device (for example, a base station), and the cell may belong to a macro base station, or may belong to a base station corresponding to a small cell. The small cell herein may include a metro cell, a micro cell, a pico cell, a femto cell, and the like. These small cells have features of small coverage and low transmit power, and are suitable for providing a high-rate data transmission service.

The core network device may be a core network element, for example, an access and mobility management function (AMF) entity, a session management function (SMF) entity, a user plane function (UPF) entity, or a policy control function (PCF) entity. The AMF entity provides a mobility management function in a core network, and is mainly responsible for access and mobility control, including registration management (registration management, RM) and connection management (CM), access authentication and access authorization, reachability management, mobility management, and the like. The SMF entity is a session management function in the core network. In addition to performing mobility management on a terminal device, the AMF entity is further responsible for forwarding a session management related message between the terminal device and the SMF entity. The PCF entity is a policy management function in the core network, and is responsible for formulating a policy related to mobility management, session management, charging, and the like of the terminal device. The UPF entity is a user plane function in the core network, performs data transmission with an external data network through an interface, and performs data transmission with an access network device through an interface. The UPF entity mainly provides user plane support, including a connection point between a PDU session and a data network, data packet routing and forwarding, data packet detection and user plane policy enforcement, QoS processing for a user plane, downlink data packet buffering, downlink data notification triggering, and the like.

It should be understood that the functional units of the core network may work independently, or may be combined to implement some control functions. For example, the AMF, the SMF, and the PCF may be combined to serve as a management device, to implement access control and mobility management functions such as access authentication, security encryption, and location registration of the terminal device, session management functions such as user plane transmission path recording, release, and change, and functions such as analysis of data (such as congestion) related to some slices and data related to the terminal device. As a gateway device, the UPF mainly implements functions such as user plane data routing and forwarding, for example, is responsible for filtering a data packet of the terminal device, transmitting/forwarding data, controlling a rate, and generating charging information.

The technical solutions of embodiments of this application may be used in various communication systems, such as a global system for mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, and a fifth generation (5th generation, 5G) system or a new radio (NR) system. In addition, the technical solutions may be further used in a subsequent evolved system, for example, a sixth generation 6G communication system or even a more advanced seventh generation 7G communication system.

With progress of society and continuous development of technologies, users have increasingly high requirements for audio services. Three-dimensional audio has become a new trend of audio service development because it can bring better immersive experience to users. To implement a three-dimensional audio service, an original audio signal format that needs to be compressed and coded may be classified into: a sound channel-based audio signal format, an object-based audio signal format, a scene-based audio signal format, and a hybrid signal format of any three audio signal formats. Regardless of which format is used, an audio signal that needs to be compressed and coded by a three-dimensional audio codec include a plurality of signals. Generally, the three-dimensional audio codec downmixes the plurality of signals through correlation between channels, to obtain a downmixed signal and a multi-channel coding parameter. Generally, a quantity of channels of the downmixed signal is far less than a quantity of channels of an input signal. For example, a multi-channel signal is downmixed into a stereo signal, and then the downmixed signal is coded by using a core coder. The stereo signal may be further downmixed into a monophonic signal and a stereo coding parameter. A quantity of bits used for the coded downmixed signal and a quantity of bits used for the multi-channel coding parameter are far less than that of an independently coded multi-channel input signal. In addition, in the core coder, to reduce a coding bit rate, correlation between signals in different frequency bands is usually further used for coding.

A basic principle of performing coding through correlation between the signals in different frequency bands is to generate a high frequency band signal by using a low frequency band signal and by using a method such as spectral band replication or bandwidth extension. A latest 3GPP enhanced speech service (Enhanced Voice Service, EVS) audio codec, a moving picture experts group high-efficiency advanced audio coding (MPEG HE-AAC) audio codec, and a unified speech and audio coding (USAC) audio codec use the correlation between the signals in different frequency bands and use a bandwidth extension technology or spectral band replication technology to code a high frequency band signal, so as to code the high frequency band signal with a small quantity of bits, thereby reducing a coding bit rate of an encoder. However, in a real audio signal, a spectrum of a high frequency band usually has some tonal components that are not similar to tonal components of a spectrum of a low frequency band.

Due to a limitation of a quantity of coding bits, when information about a tonal component in the high frequency band signal is coded, how to determine a tonal component that needs to be coded and efficiently use a limited quantity of coding bits to obtain better coding effect becomes one of key technologies that affect coding quality.

Currently, in the conventional technology, a common practice is to: perform peak search based on a power spectrum of a high frequency band signal, to obtain peak quantity information, peak position information, and peak energy or amplitude information; and sort found peaks based on energy or amplitudes of the peaks, and sequentially select several peaks with higher energy as tonal components that need to be coded.

In an audio encoder, first encoding including bandwidth extension encoding is already performed on a high frequency band of an audio signal. When second encoding is performed on a high frequency band signal, a method for detecting and encoding a tonal component in the conventional technology does not consider that a part of the tonal component can be reserved in a first encoding method and encoded in third encoding, and the part of the tonal component may be repeatedly encoded in a second encoding method, which causes a waste of a quantity of coding bits. Similarly, in the third encoding, a tonal component that can be encoded in the second encoding method is not considered, and in a process of encoding, in the third encoding, a spectrum of a high frequency band signal obtained through bandwidth extension processing, the tonal component that has been encoded in the second encoding may be repeatedly encoded, thereby causing a waste of a quantity of coding bits.

Therefore, this application provides an audio encoding method. A spectrum of a high frequency band signal obtained through bandwidth extension processing is adjusted based on information about a tonal component of the high frequency band signal, to obtain an adjusted spectrum of the high frequency band signal, and then third encoding is performed on the adjusted spectrum of the high frequency band signal, thereby avoiding encoding redundancy of the tonal component of the high frequency band signal caused by the third encoding directly performed on the spectrum obtained through bandwidth extension processing.

Figure 8:
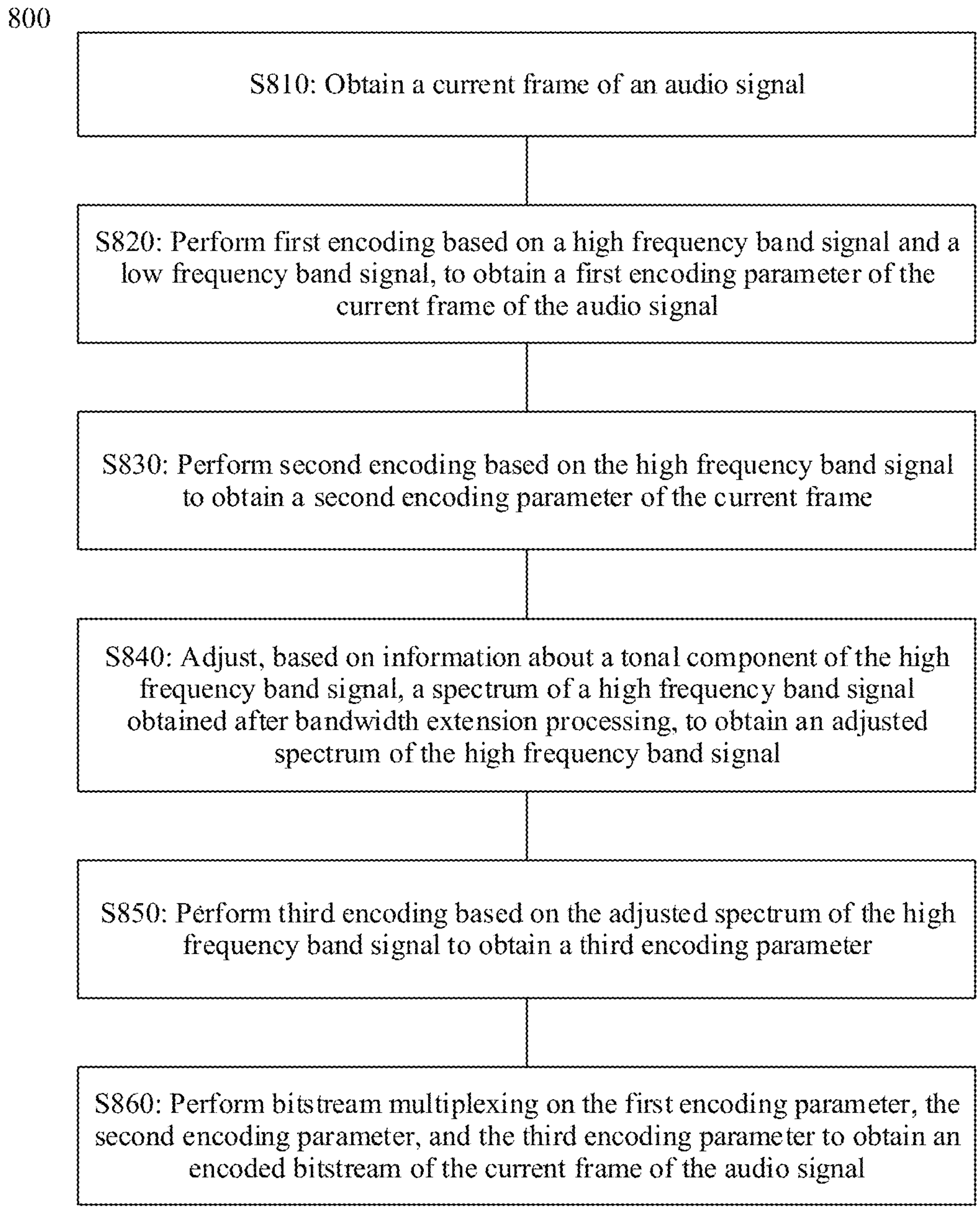
FIG. 8 is a schematic flowchart of an audio processing method according to an embodiment of this application.

The following describes in detail an audio processing method according to this application with reference to FIG. 8. FIG. 8 is a schematic flowchart of an audio processing method 800 according to an embodiment of this application. The method 800 may be applied to the scenarios shown in FIG. 1 to FIG. 7, and certainly may alternatively be applied to another communication scenario. This is not limited in this embodiment of this application.

It should be further understood that, in this embodiment of this application, the method may be performed by a terminal device, an access network device, and a core network device. By way of example, and not limitation, the method may alternatively be performed by a chip, a chip system, a processor, or the like used in the terminal device, the access network device, and the core network device. The terminal device, the access network device, and the core network device each have a coding function, and may also be referred to as coding devices.

As shown in FIG. 8, the method 800 shown in FIG. 8 may include S810 to S860. The following describes steps in the method 800 in detail with reference to FIG. 8.

S810: Obtain a current frame of an audio signal, where the current frame of the audio signal includes a high frequency band signal and a low frequency band signal.

It should be understood that the current frame of the audio signal may be any frame of the audio signal, and the current frame of the audio signal may include the high frequency band signal and the low frequency band signal. Division into the high frequency band signal and the low frequency band signal may be determined based on a frequency band threshold. A signal greater than or equal to the frequency band threshold is a high frequency band signal, and a signal less than the frequency band threshold is a low frequency band signal. The frequency band threshold may be an empirical value, or may be determined based on a transmission bandwidth, and data processing capabilities of an encoding component and a decoding component. This is not limited herein.

The high frequency band signal and the low frequency band signal are relative. For example, a signal lower than a frequency band threshold is a low frequency band signal, and a signal higher than the frequency band threshold is a high frequency band signal (a signal corresponding to the frequency band threshold may be classified into a low frequency band signal or a high frequency band signal). The frequency band threshold varies with a bandwidth of the current frame. For example, when the current frame is a wideband signal of 0 kHz to 8 kHz, the frequency band threshold may be 4 kHz; and when the current frame is an ultra-wideband signal of 0 kHz to 16 kHz, the frequency band threshold may be 8 kHz.

S820: Perform first encoding based on the high frequency band signal and the low frequency band signal, to obtain a first encoding parameter of the current frame of the audio signal, where the first encoding includes bandwidth extension encoding.

In a first encoding process, the high frequency band signal and the low frequency band signal of the current frame of the audio signal need to be processed, a plurality of types of parameters need to be extracted, and the extracted parameters is encoded. In addition, in the first encoding process, the bandwidth extension encoding needs to be performed to determine which signals in the high frequency band signal may be encoded based on the low frequency band signal by using a bandwidth extension technology or a spectral band replication technology. In a process of the bandwidth extension encoding, a signal spectrum obtained before bandwidth extension processing, a signal spectrum obtained through bandwidth extension processing, and a frequency range of bandwidth extension processing may be obtained at the same time. The signal spectrum obtained through bandwidth extension processing includes a spectral component that cannot be reconstructed through bandwidth extension processing in the signal spectrum obtained before bandwidth extension processing, or includes a spectral component with a large amplitude in the signal spectrum obtained before bandwidth extension processing. For example, a frequency range of the current frame of the audio signal is 0 kHz to 8 kHz, where low frequency band signals are in 0 kHz to 4 kHz, and high frequency band signals are in 4 kHz to 8 kHz. Bandwidth extension encoding is performed in 4 kHz to 8 kHz through correlation between signals. However, a signal spectrum in 5 kHz to 6 kHz has a spectral component with a large amplitude, the spectral component cannot be reconstructed through bandwidth extension processing, bandwidth extension encoding cannot be performed on the spectral component, and the spectral component needs to be encoded in the subsequent third encoding process. Bandwidth extension encoding may be performed on the remaining 4 kHz to 5 kHz and 6 kHz to 8 kHz.

A frequency range for bandwidth extension processing may be a frequency bin range for bandwidth extension processing, for example, a start frequency bin and an end frequency bin for intelligent gap filling (IGF) processing. Alternatively, another form may be used to represent the frequency range for bandwidth extension processing, for example, a start frequency value and an end frequency value.

In an encoding process, a high frequency band may be divided into K tiles (for example, tile), and each tile is further divided into M bands (for example, scale factor bands (SFB)). Bandwidth extension information may be determined by using a tile as a unit, or may be determined by using a band.

The first encoding parameter may include the bandwidth extension information. For example, the bandwidth extension encoding may include the IGF processing, and the bandwidth extension information includes bandwidth envelope information, spectral whitening information, and the like.

The first encoding parameter may further specifically include a time domain noise shaping parameter, a frequency domain noise shaping parameter, and the like.

S830: Perform second encoding based on the high frequency band signal to obtain a second encoding parameter of the current frame, where the second encoding parameter indicates information about a tonal component of the high frequency band signal.

In a second encoding process, a tonal component information parameter of the high frequency band signal may be extracted, and then the tonal component information parameter is encoded to obtain the second encoding parameter of the current frame.

Optionally, the information about the tonal component includes at least one or more of the following parameters: flag information of the tonal component, location information of the tonal component, quantity information of the tonal component, amplitude information of the tonal component, or energy information of the tonal component. The second encoding may include tonal component encoding. The second encoding parameter of the current frame may include a location-quantity parameter of the tonal component, and an amplitude parameter or an energy parameter of the tonal component.

A high frequency band parameter of the current frame may also include the location parameter and the quantity parameter of the tonal component, and the amplitude parameter or the energy parameter of the tonal component. The high frequency band parameter of the current frame may be understood as the second encoding parameter of the current frame.

Generally, a process of obtaining the second encoding parameter of the current frame based on the high frequency band signal is performed based on division into tiles and/or division into subbands of the high frequency band. For example, a high frequency band corresponding to the high frequency band signal includes at least one tile, and one tile includes at least one subband.

A quantity of tiles in which the high frequency band parameter needs to be obtained may be preset. For example, the high frequency band corresponding to the high frequency band signal includes five tiles, and it is preset that the high frequency band parameter needs to be obtained from three tiles. The three tiles in which the high frequency band parameter needs to be obtained may be three specified tiles in the five tiles, or may be any three tiles in the five tiles. The quantity of tiles in which the high frequency band parameter needs to be obtained may alternatively be calculated based on a specific algorithm. This is not limited in this embodiment of this application. The following uses an example in which a location-quantity parameter of a tonal component and an amplitude parameter of the tonal component are determined in one tile as an example for further description. For example, the high frequency band corresponding to the high frequency band signal includes five tiles. The following describes determining a location-quantity parameter of a tonal component and an amplitude parameter of the tonal component in a tile 1.

Figure 9:
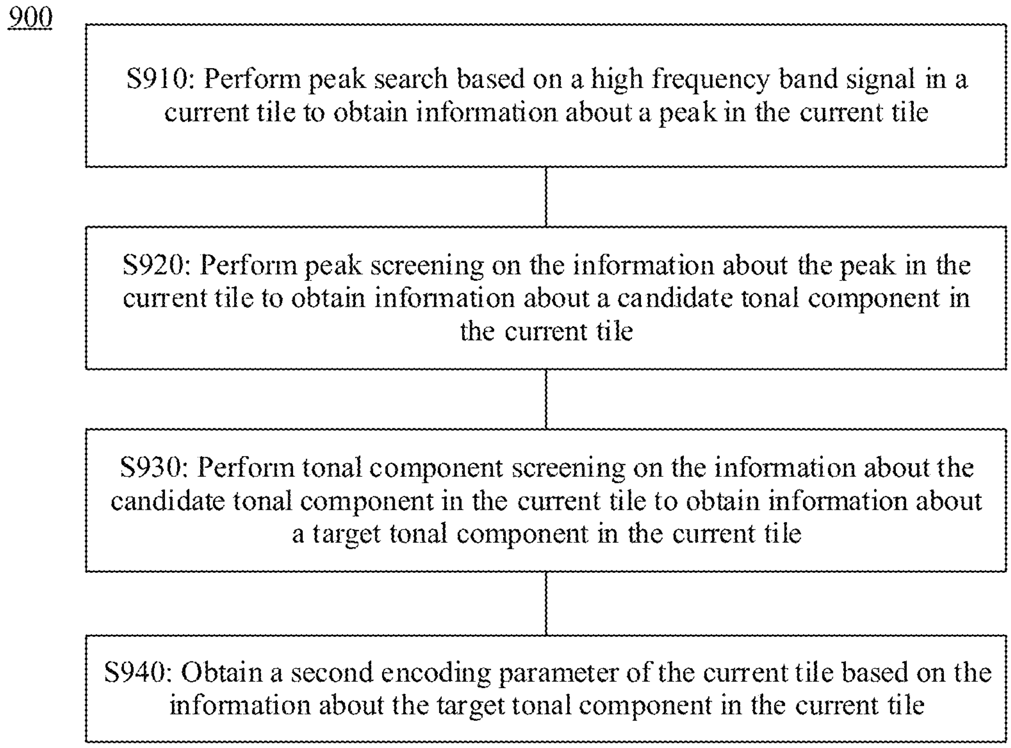
FIG. 9 is a schematic flowchart of a method for obtaining a second encoding parameter of a current tile according to an embodiment of this application.

FIG. 9 is a schematic flowchart of a method 900 for obtaining a second encoding parameter of a current tile. The method 900 may be applied to the scenarios shown in FIG. 1 to FIG. 7, or certainly may be applied to another communication scenario. This is not limited in this embodiment of this application.

It should be further understood that, in this embodiment of this application, the method may be performed by a terminal device, an access network device, and a core network device. By way of example, and not limitation, the method may alternatively be performed by a chip, a chip system, a processor, or the like used in the terminal device, the access network device, and the core network device. The terminal device, the access network device, and the core network device each have a coding function, and may also be referred to as coding devices.

As shown in FIG. 9, the method 900 shown in FIG. 9 may include S910 to S940. The following describes steps in the method 900 in detail with reference to FIG. 9.

S910: Perform peak search based on a high frequency band signal in the current tile to obtain information about a peak in the current tile, where the information about the peak in the current tile includes: quantity information of the peak in the current tile, location information of the peak in the current tile, energy information of the peak in the current tile, or amplitude information of the peak in the current tile.

Specifically, a power spectrum of the high frequency band signal in the current tile may be obtained based on the high frequency band signal in the current tile. A peak of the power spectrum is searched for based on the power spectrum of the high frequency band signal in the current tile. A quantity of peaks of the power spectrum is used as the quantity information of the peak in the current tile. A frequency bin index corresponding to the peak of the power spectrum is used as the location information of the peak in the current tile. An amplitude or energy of the peak of the power spectrum is used as the amplitude information or the energy information of the peak in the current tile.

Alternatively, a power spectrum ratio of a current frequency bin in the current tile may be obtained based on the high frequency band signal in the current tile, where the power spectrum ratio of the current frequency bin is a ratio of a power spectrum value of the current frequency bin to an average value of power spectra of the current tile. Peak search is performed in the current tile based on the power spectrum ratio of the current frequency bin, to obtain the quantity information of the peak, the location information of the peak, the amplitude information of the peak or the energy information of the peak in the current tile. The amplitude information of the peak or the energy information of the peak includes a power spectrum ratio of the peak, and the power spectrum ratio of the peak is a ratio of a power spectrum value of a frequency bin corresponding to the peak to the average value of the power spectra of the current tile. Certainly, peak search may alternatively be performed by using another technology to obtain the quantity information of the peak, the location information of the peak, and the amplitude information of the peak or the energy information of the peak in the current tile. This is not limited in this embodiment of this application.

In an embodiment of this application, the location information of the peak and the energy information of the peak in current tile may be respectively stored in peak_idx and peak val arrays, and the quantity information of the peak in the current tile is denoted as peak_cnt.

S920: Perform peak screening on the information about the peak in the current tile to obtain information about a candidate tonal component in the current tile.

After the information about the peak in the current tile is obtained, peak screening is performed on the information about the peak in the current tile, to obtain the information about the candidate tonal component in the current tile.

A specific manner of peak screening may be: based on information about a bandwidth extension spectrum reservation flag of the current tile and the quantity information of the peak, the location information of the peak, and the amplitude information of the peak or the energy information of the peak in the current tile, obtaining screened quantity information of the peak, screened location information of the peak, and screened amplitude information of the peak or energy information of the peak in the current tile.

The screened quantity information of the peak, the screened location information of the peak, and the screened amplitude information of the peak or the screened energy information of the peak in the current tile are used as the information about the candidate tonal component in the current tile. The amplitude information of the peak or the energy information of the peak may include an energy ratio of the peak or a power spectrum ratio of the peak. Quantity information of the candidate tonal component may be peak-screened quantity information of the peak, location information of the candidate tonal component may be peak-screened location information of the peak, amplitude information of the candidate tonal component may be peak-screened amplitude information of the peak, and energy information of the candidate tonal component may be peak-screened energy information of the peak.

S930: Perform tonal component screening on the information about the candidate tonal component in the current tile to obtain information about a target tonal component in the current tile.

For example, combination processing is performed on candidate tonal components with a same subband index in the current tile, to obtain information about a combination-processed candidate tonal component in the current tile. The information about the target tonal component in the current tile is obtained based on the information about the combination-processed candidate tonal component in the current tile.

For another example, the information about the target tonal component in the current tile is obtained based on the information about the candidate tonal component in the current tile and information about a maximum quantity of codable tonal components in the current tile.

For still another example, a subband index corresponding to the candidate tonal component in the current tile of the current frame is obtained based on the location information of the candidate tonal component in the current tile of the current frame. A subband index corresponding to a candidate tonal component in a current tile of a previous frame of the current frame is obtained. If location information of an $n^{th}$ candidate tonal component in the current tile of the current frame and location information of an $n^{th}$ candidate tonal component in the current tile of the previous frame meet a preset condition, and the subband index corresponding to the $n^{th}$ candidate tonal component in the current tile of the current frame is different from the subband index corresponding to the $n^{th}$ candidate tonal component in the current tile of the previous frame, the location information of the $n^{th}$ candidate tonal component in the current tile of the current frame is corrected, to obtain the information about the target tonal component in the current tile, where the $n^{th}$ candidate tonal component is any one candidate tonal component in the current tile.

Alternatively, any combination of the foregoing plurality of methods may be used. This is not limited in this embodiment of this application.

S940: Obtain the second encoding parameter of the current tile based on the information about the target tonal component in the current tile.

The foregoing content specifically describes the method for obtaining the second encoding parameter of the current tile. The foregoing method for obtaining the second encoding parameter of the current tile is merely used as an example. This is not limited in this embodiment of this application.

S840: Adjust, based on the information about the tonal component of the high frequency band signal, a spectrum of a high frequency band signal obtained through bandwidth extension processing, to obtain an adjusted spectrum of the high frequency band signal, where the spectrum of the high frequency band signal obtained through bandwidth extension processing is obtained in the bandwidth extension encoding process.

Adjusting, based on the information about the tonal component of the high frequency band signal, a spectrum of a high frequency band signal obtained through bandwidth extension processing may be adjusting the spectrum of the high frequency band signal obtained through bandwidth extension processing based on one or more of flag information, location information, quantity information, amplitude information, or energy information of the tonal component, to obtain the adjusted spectrum.

Generally, a process of adjusting the spectrum of the high frequency band signal obtained through bandwidth extension processing is performed according to tile and/or subband division. For example, the high frequency band corresponding to the high frequency band signal includes the at least one tile, and one tile includes the at least one subband.

Optionally, the spectrum of the high frequency band signal obtained through bandwidth extension processing may be adjusted based on the quantity information of the tonal component of the high frequency band signal. The high frequency band corresponding to the high frequency band signal includes the at least one tile, and the at least one tile includes the current tile. The adjusting, based on the information about the tonal component of the high frequency band signal, a spectrum of a high frequency band signal obtained through bandwidth extension processing, to obtain an adjusted spectrum of the high frequency band signal includes: adjusting the spectrum of the high frequency band signal obtained through bandwidth extension processing in the current tile based on quantity information of a tonal component in the current tile, to obtain the adjusted spectrum of the high frequency band signal in the current tile.

Therefore, in the audio encoding method in this embodiment of this application, the spectrum of the high frequency band signal obtained through bandwidth extension processing is adjusted based on the quantity information of the tonal component of the high frequency band signal, to obtain the adjusted spectrum of the high frequency band signal in the current tile, and then third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

Optionally, the adjusting, based on the quantity information of the tonal component in the current tile, a spectrum of a high frequency band signal obtained through bandwidth extension processing in the current tile, to obtain an adjusted spectrum of the high frequency band signal in the current tile includes: if the quantity information of the tonal component in the current tile meets a first preset condition, adjusting the spectrum of the high frequency band signal obtained through bandwidth extension processing in the current tile, to obtain the adjusted spectrum of the high frequency band signal in the current tile.

Optionally, the first preset condition is that a quantity of tonal components in the current tile is greater than or equal to a first threshold. When the first threshold is 5, in other words, when the quantity of tonal components in the current tile is greater than or equal to 5, the spectrum of the high frequency band signal obtained through bandwidth extension processing in the current tile is adjusted. It may be understood that a value of the first threshold may be another value, for example, 4 or 6. A specific value may be set based on experience or a requirement.

Optionally, the first preset condition is that the quantity of tonal components in the current tile is within a first interval, where the first interval may be a number range. When the first interval is [3, 5], in other words, when the quantity of tonal components in the current tile is greater than or equal to 3 and less than or equal to 5, the spectrum of the high frequency band signal obtained through bandwidth extension processing in the current tile is adjusted.

Optionally, the adjusting a spectrum of a high frequency band signal obtained through bandwidth extension processing in the current tile, to obtain an adjusted spectrum of the high frequency band signal in the current tile includes: setting an adjusted spectrum value of the current tile as a second preset value. For example, when a quantity of tonal components of a $p^{th}$ tile (tile) is greater than 0, an adjusted spectrum value of the $p^{th}$ tile is set to zero. The adjusted spectrum value of the $p^{th}$ tile is set to zero, so that a reserved spectral component obtained through IGF is removed (that is, the spectrum value is set to 0), and no encoding is performed in the subsequent third encoding process, thereby avoiding encoding redundancy of the tonal component of the high frequency band signal caused by the third encoding directly performed on the spectrum obtained through bandwidth extension processing.

Specifically, for example, a frequency range of the current frame of the audio signal is 0 kHz to 8 kHz, where low frequency band signals are in 0 kHz to 4 kHz, and high frequency band signals are in 4 kHz to 8 kHz. In the first encoding process, bandwidth extension encoding is performed in 4 kHz to 8 kHz through correlation between signals. However, the signal spectrum in 5 kHz to 6 kHz has the spectral component with a large amplitude, the spectral component cannot be reconstructed through bandwidth extension processing, bandwidth extension encoding cannot be performed on the spectral component, and the spectral component needs to be encoded in the subsequent third encoding process. Bandwidth extension encoding may be performed on the remaining 4 kHz to 5 kHz and 6 kHz to 8 kHz. In the second encoding process, information about a tonal component in 5 kHz to 6 kHz is detected, where a quantity of tonal components in 5 kHz to 6 kHz is greater than zero. An adjusted spectrum value of 5 kHz to 6 kHz may be set to zero, so that encoding is not performed again in the subsequent third encoding process. This avoids encoding redundancy caused by repeated encoding of the spectrum in 5 kHz to 6 kHz in the second encoding and the third encoding.

Pseudocode for setting the adjusted spectrum value of the $p^{th}$ tile to zero is implemented as follows:

```
if tone_cnt[p] > 0
  for sb = tile[p] to tile[p+1]−1
    mdctSpectrumAfterIGF[sb] = 0
  end
end
```

tone_cnt[p] is quantity information of the tonal component of the $p^{th}$ tile, tile[p] is a start frequency pin of the $p^{th}$ tile, tile[p+1] is a start frequency pin of a $(p+1)^{th}$ tile, tile [p+1]−1 is an end frequency bin of the $p^{th}$ tile, sb is a frequency bin index, and mdctSpectrumAfterIGF is the spectrum obtained through bandwidth extension processing, that is, a spectrum obtained through IGF processing.

Optionally, the adjusting a spectrum of a high frequency band signal obtained through bandwidth extension processing in the current tile, to obtain an adjusted spectrum of the high frequency band signal in the current tile includes: weighting the spectrum of the high frequency band signal obtained through bandwidth extension processing in the current tile, to obtain the adjusted spectrum of the high frequency band signal in the current tile.

Weighting processing may be weighting spectrum values of all frequency bins in the current tile by using a preset weighting coefficient, or weighting the spectrum values of all frequency bins in the current tile by using a calculated weighting coefficient. A manner of calculating the weighting coefficient may be linear or non-linear. Weighting coefficients corresponding to different frequency bins may be the same or may be different. A specific method for obtaining the weighting coefficient is not limited in this embodiment of this application.

Optionally, the information about the tonal component of the high frequency band signal further includes flag information about a tonal component of the current tile, and adjustment may be performed on the spectrum of the high frequency band signal obtained through bandwidth extension processing based on the flag information of the tonal component of the current tile.

Optionally, a high frequency band corresponding to the high frequency band signal includes the at least one tile, and the at least one tile includes the current tile. The adjusting, based on the information about the tonal component of the high frequency band signal, a spectrum of a high frequency band signal obtained through bandwidth extension processing, to obtain an adjusted spectrum of the high frequency band signal includes: adjusting, based on the flag information of the tonal component in the current tile, the spectrum of the high frequency band signal obtained through bandwidth extension processing in the current tile, to obtain the adjusted spectrum of the high frequency band signal in the current tile, where the flag information of the tonal component indicates whether the tonal component exists in the current tile.

Optionally, the flag information of the tonal component is obtained by detecting the tonal component in the current tile.

Optionally, if a value of the flag information of the tonal component in the current tile is a first preset value, the spectrum of the high frequency band signal obtained through bandwidth extension processing in the current tile is adjusted, to obtain the adjusted spectrum of the high frequency band signal in the current tile. The value of the flag information of the tonal component in the current tile equal to the first preset value indicates that the tonal component exists in the current tile. For example, the value of the flag information of the tonal component may be 0 or 1, where a value of the first preset value may also be 0 or 1. To be specific, in an implementation, the value of the flag information of the tonal component in the current tile equal to 1 indicates that the tonal component exists in the current tile; or in another implementation, the value of the flag information of the tonal component in the current tile equal to 0 indicates that the tonal component exists in the current tile.

Optionally, the adjusting a spectrum of a high frequency band signal obtained through bandwidth extension processing in the current tile, to obtain an adjusted spectrum of the high frequency band signal in the current tile includes: setting a value of the spectrum of the high frequency band signal obtained through bandwidth extension processing in the current tile to a second preset value, to obtain the adjusted spectrum of the high frequency band signal in the current tile; or weighting the spectrum of the high frequency band signal obtained through bandwidth extension processing in the current tile, to obtain the adjusted spectrum of the high frequency band signal in the current tile.

For example, if the value of the flag information of the tonal component in the current tile is a second preset value 1, the spectrum of the high frequency band signal obtained through bandwidth extension processing in the current tile is weighted. A weighting processing manner may be: multiplying a spectrum value obtained through bandwidth extension processing corresponding to each frequency bin of the current tile by a preset weighting coefficient 0.5, and using a result as an adjusted spectrum value of the current tile. It may be understood that the second preset value may alternatively be set to another value.

Optionally, the high frequency band corresponding to the high frequency band signal includes the at least one tile, and the at least one tile includes the current tile. The adjusting, based on the information about the tonal component of the high frequency band signal, a spectrum of a high frequency band signal obtained through bandwidth extension processing, to obtain an adjusted spectrum of the high frequency band signal includes: adjusting, based on location information of the tonal component in the current tile, the spectrum of the high frequency band signal obtained through bandwidth extension processing in the current tile, to obtain the adjusted spectrum of the high frequency band signal in the current tile.

Therefore, in the audio encoding method in this embodiment of this application, the spectrum of the high frequency band signal obtained through bandwidth extension processing is adjusted based on the location information of the tonal component of the high frequency band signal, to obtain the adjusted spectrum of the high frequency band signal in the current tile, and then the third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

Optionally, the current tile includes at least one subband, and the at least one subband includes a current subband. The adjusting, based on the location information of the tonal component in the current tile, a spectrum of a high frequency band signal obtained through bandwidth extension processing in the current tile, to obtain an adjusted spectrum of the high frequency band signal in the current tile includes: if the location information of the tonal component in the current tile meets a second preset condition, adjusting a spectrum of a high frequency band signal obtained through bandwidth extension processing in the current subband, to obtain an adjusted spectrum of the high frequency band signal in the current subband.

In this case, adjusting the spectrum of the high frequency band signal obtained through bandwidth extension processing based on the location information of the tonal component of the high frequency band signal may implement adjustment only on the current subband corresponding to the tonal component, to avoid adjustment on another subband of the high frequency band, and reduce impact on the another subband of the high frequency band. This can implement fine adjustment, and reduce computing resources of a coding device.

Optionally, the location information of the tonal component in the current tile includes an index of a subband including the tonal component in the current tile, and the second preset condition is that the subband index of the subband including the tonal component includes an index of the current subband.

Optionally, adjusting a spectrum of a high frequency band signal obtained through bandwidth extension processing in the current subband, to obtain an adjusted spectrum of the high frequency band signal in the current subband includes: setting a value of the adjusted spectrum of the current subband to the second preset value, to obtain the adjusted spectrum of the high frequency band signal in the current subband; or weighting the spectrum of the high frequency band signal obtained through bandwidth extension processing in the current subband, to obtain the adjusted spectrum of the high frequency band signal in the current subband.

Specifically, the location information of the tonal component in the current tile is a frequency bin index corresponding to the tonal component in the current tile. First, the subband index of the tonal component in the current tile is determined based on the frequency bin index corresponding to the tonal component in the current tile and a subband division manner of the current tile. If the subband index of the tonal component includes the index of the current subband, the value of the adjusted spectrum of the current subband is set to zero. That is, a spectrum value that is obtained through bandwidth extension processing and that is of a subband corresponding to the tonal component in the current tile is adjusted to zero. For example, in the second encoding process, a tile in 5000 Hz to 6000 Hz is evenly divided into five subbands, where 5000 Hz to 5200 Hz is a subband 1, 5200 Hz to 5400 Hz is a subband 2, 5400 Hz to 5600 Hz is a subband 3, 5600 Hz to 5800 Hz is a subband 4, 5800 Hz to 6000 Hz is a subband 5, information about a tonal component in 5500 Hz in the tile of 5 kHz to 6 kHz is detected, 5500 Hz belongs to the subband 3, and a spectrum value of the subband 3 may be set to zero.

S850: Perform third encoding based on the adjusted spectrum of the high frequency band signal to obtain a third encoding parameter.

Optionally, the third encoding includes performing spectral coefficient quantization and encoding on the adjusted spectrum, for example, performing scalar quantization/vector quantization and arithmetic encoding or interval encoding on the spectral coefficient of the adjusted spectrum.

Optionally, if a low frequency band spectrum is not encoded during the first encoding, the low frequency band spectrum further needs to be encoded during the third encoding.

S860: Perform bitstream multiplexing on the first encoding parameter, the second encoding parameter, and the third encoding parameter to obtain an encoded bitstream of the current frame of the audio signal.

Therefore, in the audio encoding method in this embodiment of this application, the spectrum of the high frequency band signal obtained through bandwidth extension processing is adjusted based on the information about the tonal component of the high frequency band signal, to obtain the adjusted spectrum of the high frequency band signal in the current tile, and then the third encoding is performed on the adjusted spectrum of the high frequency band signal, thereby avoiding encoding redundancy of the tonal component of the high frequency band signal caused by the third encoding directly performed on the spectrum of the high frequency band signal obtained through bandwidth extension processing.

The foregoing embodiment specifically describes a process in which the coding device adjusts, during encoding based on the information about the tonal component of the high frequency band signal, the spectrum of the high frequency band signal obtained through bandwidth extension processing, to obtain the adjusted spectrum of the high frequency band signal in the current tile, and performs the third encoding on the adjusted spectrum of the high frequency band signal. The following specifically describes a processing procedure of the coding device during decoding.

Figure 10:
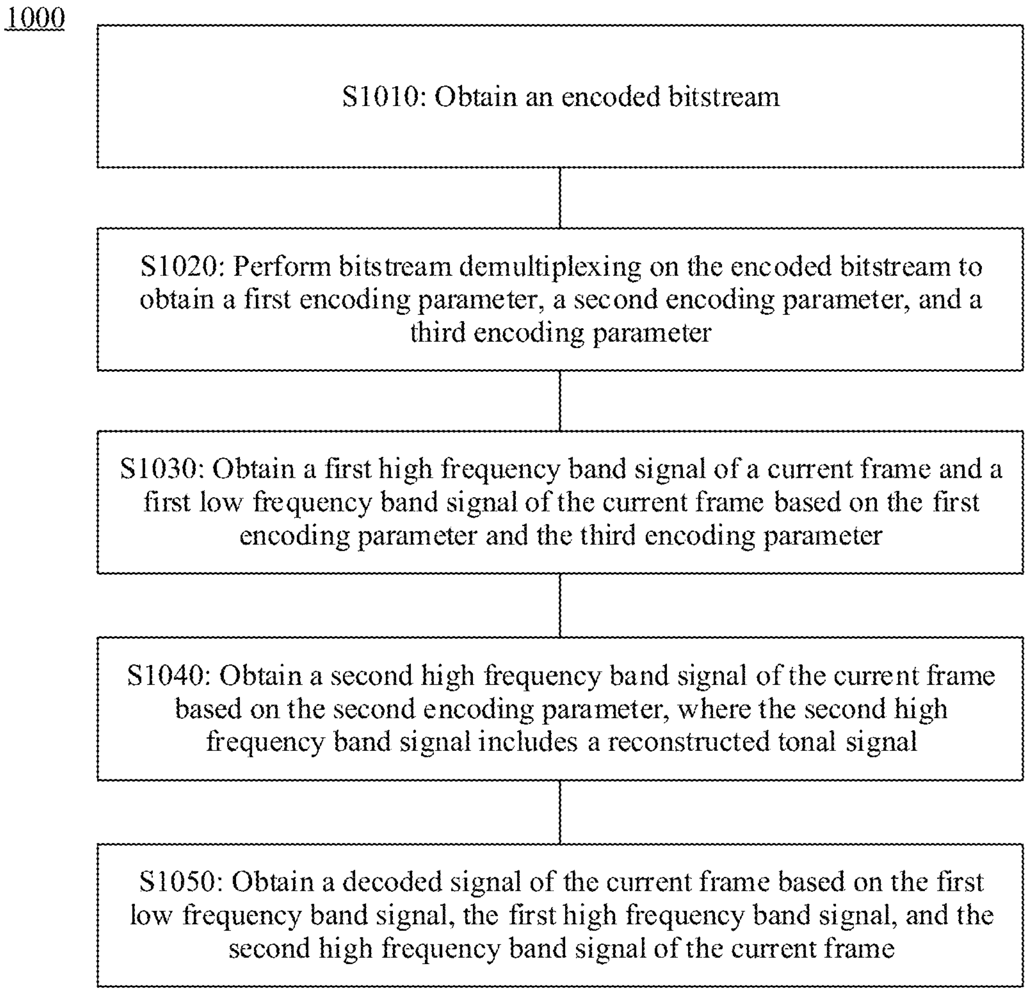
FIG. 10 is a schematic flowchart of an audio processing method according to an embodiment of this application.

FIG. 10 is a schematic flowchart of an audio decoding method 1000. The method 1000 may be applied to the scenarios shown in FIG. 1 to FIG. 7, or certainly may be applied to another communication scenario. This is not limited in this embodiment of this application.

It should be further understood that, in this embodiment of this application, the method may be performed by a terminal device, an access network device, and a core network device. By way of example, and not limitation, the method may alternatively be performed by a chip, a chip system, a processor, or the like used in the terminal device, the access network device, and the core network device. The terminal device, the access network device, and the core network device each have a coding function, and may also be referred to as coding devices.

As shown in FIG. 10, the method 1000 shown in FIG. 10 may include S1010 to S1050. The following describes steps in the method 1000 in detail with reference to FIG. 10.

S1010: Obtain an encoded bitstream.

S1020: Perform bitstream demultiplexing on the encoded bitstream to obtain a first encoding parameter of a current frame of an audio signal, a second encoding parameter of the current frame of the audio signal, and a third encoding parameter of the current frame of the audio signal.

For the first encoding parameter, the second encoding parameter, and the third encoding parameter, refer to the encoding method 800. Details are not described herein again.

S1030: Obtain a first high frequency band signal of the current frame and a first low frequency band signal of the current frame based on the first encoding parameter and the third encoding parameter.

The first high frequency band signal may include at least one of a decoded high frequency band signal obtained through direct decoding based on the first encoding parameter and the third encoding parameter, and an extended high frequency band signal obtained by performing bandwidth extension based on the first low frequency band signal.

S1040: Obtain a second high frequency band signal of the current frame based on the second encoding parameter, where the second high frequency band signal includes a reconstructed tonal signal.

The second encoding parameter includes information about a tonal component of a high frequency band signal. For example, a high frequency band parameter of the current frame includes a location-quantity parameter of the tonal component, and an amplitude parameter or an energy parameter of the tonal component. For another example, the high frequency band parameter of the current frame includes a location parameter and a quantity parameter of the tonal component, and the amplitude parameter or the energy parameter of the tonal component. For the high frequency band parameter of the current frame, refer to the encoding method 800. Details are not described herein again.

Similar to a processing procedure method on an encoder side, in a processing procedure on a decoder side, a process of obtaining a reconstructed high frequency band signal of the current frame based on the high frequency band parameter is also performed based on division into tiles and/or division into subbands of a high frequency band. A high frequency band corresponding to the high frequency band signal includes at least one tile, and one tile includes at least one subband. A quantity of tiles of the high frequency band parameter that needs to be determined may be given in advance, or may be obtained from a bitstream.

Herein, descriptions are further provided by using an example in which a reconstructed high frequency band signal of a current frame is obtained in one tile based on a location-quantity parameter of a tonal component and an amplitude parameter of the tonal component.

Specifically, a location of the tonal component in the current tile is determined based on a location-quantity parameter of the tonal component in the current tile. An amplitude or energy corresponding to the location of the tonal component is determined based on amplitude parameter or energy parameter of the tonal component in the current tile. The reconstructed high frequency signal is obtained based on the location of the tonal component in the current tile and the amplitude or energy corresponding to the location of the tonal component.

S1050: Obtain a decoded signal of the current frame based on the first low frequency band signal, the first high frequency band signal, and the second high frequency band signal of the current frame.

In this embodiment of this application, before step S840 in the method 800, the adjusting, based on the information about the tonal component of the high frequency band signal, a spectrum of a high frequency band signal obtained through bandwidth extension processing, to obtain an adjusted spectrum of the high frequency band signal, the method may further include: determining, based on an encoding rate of the current frame, a tile range in which whether to adjust the spectrum of the high frequency band signal obtained through bandwidth extension processing needs to be determined.

It should be understood that, after the range of the tile in which it is determined whether to perform spectrum adjustment in the current frame is determined, step S840 further needs to be performed. To be specific, in the range of the tile in which it is determined whether to perform spectrum adjustment in the current frame, it is determined whether to adjust, based on the information about the tonal component of the high frequency band signal, the spectrum of the high frequency band signal obtained through bandwidth extension processing, to obtain the adjusted spectrum of the high frequency band signal.

Specifically, the tile in which it is determined whether to adjust the spectrum of the high frequency band signal obtained through bandwidth extension processing may also be referred to as a preselected area. After the preselected area is determined, the spectrum of the high frequency band signal obtained through bandwidth extension processing is adjusted based on the information about the tonal component of the high frequency band signal, to obtain the adjusted spectrum of the high frequency band signal. In the preselected area of the current frame, further determining needs to be performed based on information about a tonal component in the preselected area and the foregoing preset value and the foregoing preset condition. If the information about the tonal component in the preselected area of the current frame meets the preset value and the preset condition, spectrum adjustment is performed on the preselected area of the current frame. If the information about the tonal component in the preselected area of the current frame does not meet the preset value and the preset condition, spectrum adjustment is not performed on the preselected area of the current frame.

It should be understood that this step may be performed at any position before step S840 in the method 800.

In an implementation, determining a range of the preselected area of the current frame based on the encoding rate of the current frame includes: determining a first tile range based on the encoding rate of the current frame. The first tile range is the range of the preselected area. The adjusting, based on the information about the tonal component of the high frequency band signal, a spectrum of a high frequency band signal obtained through bandwidth extension processing, to obtain an adjusted spectrum of the high frequency band signal includes: adjusting, in the first tile range based on the information about the tonal component of the high frequency band signal, the spectrum of the high frequency band signal obtained through bandwidth extension processing, to obtain the adjusted spectrum of the high frequency band signal.

It should be understood that, during encoding, encoding rates of different frames may be different. Therefore, it is necessary to determine, based on different encoding rates, a range of tiles that correspond to all the encoding rates and in which whether it is determined whether to adjust the spectrum of the high frequency band signal obtained through bandwidth extension processing.

It should be further understood that the encoding rate of the current frame may be an average encoding rate of each channel of the current frame. The average encoding rate of each channel of the current frame may be determined based on a total encoding rate of the current frame and a quantity of channels.

Optionally, the determining a first tile range based on the encoding rate of the current frame includes: If the encoding rate of the current frame meets a third preset condition, the first tile range is a first range, where the first range includes a start tile of the first range and an end tile of the first range; or if the encoding rate of the current frame does not meet a third preset condition, the first tile range is a second range, where the second range includes a start tile of the second range and an end tile of the second range, and a frequency range corresponding to the first range is not completely the same as a frequency range corresponding to the second range. That a frequency range corresponding to the first range is not completely the same as a frequency range corresponding to the second range indicates that the frequency range corresponding to the first range and the frequency range corresponding to the second range may partially overlap, but are not completely the same.

For example, it is assumed that a total encoding rate of an encoder of the current frame is bitrate_tot, and a quantity of channels is n_channels. In this case, an average encoding rate of each channel is bitrate_ch=bitrate_tot/n_channels. If the average encoding rate is greater than 24 kb/s, the first tile range is empty, in other words, the spectrum of the high frequency band signal obtained through bandwidth extension processing is not adjusted in all tiles. If the average encoding rate is less than or equal to 24 kb/s, the first tile range ranges from a second tile to a fourth tile.

For another example, the average encoding rate of each channel is bitrate_ch. If the average encoding rate is greater than 24 kb/s, the first tile range is a fourth tile, in other words, the first range is the fourth tile. If the average encoding rate is less than or equal to 24 kb/s, the first tile range ranges from a second tile to the fourth tile, in other words, the second range ranges from the second tile to the fourth tile.

Definitely, based on different encoding rates, the range of a tile that corresponds to each encoding rate and in which whether to adjust the spectrum of the high frequency band signal obtained through bandwidth extension processing needs to be determined, and based on more preset conditions, different tile ranges may be controlled to be used under different encoding rates.

For example, if the average encoding rate of the current frame is greater than 48 kb/s, the first tile range is empty. That is, the spectrum of the high frequency band signal obtained through bandwidth extension processing needs to be adjusted in no tile. The average encoding rate of the current frame is less than or equal to 48 kb/s and greater than 24 kb/s, and the first tile range is the fourth tile, in other words, the first range is the fourth tile. To be specific, the spectrum of the high frequency band signal obtained through bandwidth extension processing is adjusted only in the fourth tile based on the information about the tonal component of the high frequency band signal. When the average encoding rate of the current frame is less than or equal to 24 kb/s, the first tile range ranges from the second tile to the fourth tile, in other words, the second range ranges from the second tile to the fourth tile.

In an implementation, the determining a range of the preselected area of the current frame based on the encoding rate of the current frame includes: determining a start tile based on the encoding rate of the current frame, where the start tile is a tile with a smallest index in the range of the preselected area. The adjusting, based on the information about the tonal component of the high frequency band signal, a spectrum of a high frequency band signal obtained through bandwidth extension processing, to obtain an adjusted spectrum of the high frequency band signal includes: adjusting, based on the information about the tonal component of the high frequency band signal from the start tile, the spectrum of the high frequency band signal obtained through bandwidth extension processing, to obtain the adjusted spectrum of the high frequency band signal.

Optionally, the determining a start tile based on the encoding rate of the current frame includes: if the encoding rate of the current frame meets a third preset condition, the start tile is a first start tile; or if the encoding rate of the current frame does not meet a third preset condition, the start tile is a second start tile, where a frequency range corresponding to the first start tile is different from a frequency range corresponding to the second start tile. That a frequency range corresponding to the first start tile is different from a frequency range corresponding to the second start tile indicates that the frequency range corresponding to the first start tile is completely different from the frequency range corresponding to the second start tile.

For example, it is assumed that a total encoding rate of an encoder of the current frame is bitrate_tot and a quantity of channels is n_channels. In this case, an average encoding rate of each channel is bitrate_ch=bitrate_tot/n_channels. If the average encoding rate of each channel is greater than 24 kb/s, the start tile is num_tiles, that is, from a num_tiles$^{th}$ tile to a tile with a higher frequency range of the current frame, the spectrum of the high frequency band signals after bandwidth extension processing may be further adjusted based on the information about the tonal component of the high frequency band signal, to obtain the adjusted spectrum of the high frequency band signals. If the average encoding rate of each channel is less than or equal to 24 kb/s, the start tile is 1. The spectrum of the high frequency band signal obtained through bandwidth extension processing may be further adjusted in a tile with a tile index of 1 and a tile with a higher frequency range based on the information about the tonal component of the high frequency band signal, to obtain the adjusted spectrum of the high frequency band signal.

If a value of the start tile is greater than an index of a tile with a highest frequency range of the current frame, it indicates that the spectrum after bandwidth extension processing based on the information about the tonal component of the high frequency band signal needs to be adjusted in no tile, to obtain the adjusted spectrum.

For another example, the current frame includes four tiles, namely, a tile 0, a tile 1, a tile 2, and a tile 3. If the average encoding rate of each channel is greater than 24 kb/s, the start tile is 2. To be specific, the spectrum of the high frequency band signal obtained through bandwidth extension processing may be further adjusted in the tile 2 and tile 3 based on the information about the tonal component of the high frequency band signal, to obtain the adjusted spectrum of the high frequency band signal. If the average encoding rate of each channel is less than or equal to 24 kb/s, the start tile is 1, that is, the tile 1, the tile 2, and the tile 3 may further adjust the frequency spectrum of the high frequency band signal obtained through bandwidth extension processing based on the information about the tonal component of the high frequency band signal, so as to obtain the adjusted frequency spectrum of the high frequency band signal. If the average encoding rate of each channel is greater than 48 kb/s, the start tile is 4, which indicates that no tile needs to adjust the spectrum after bandwidth extension processing based on the information about the tonal component of the high frequency band signal, to obtain the adjusted spectrum.

In this embodiment of this application, before step S840 in the method 800, before the adjusting, based on the information about the tonal component of the high frequency band signal, a spectrum of a high frequency band signal obtained through bandwidth extension processing, to obtain an adjusted spectrum of the high frequency band signal, the method may further include: determining whether the current tile belongs to the first tile range based on the spectrum of the high frequency band signal obtained through bandwidth extension processing in the current tile, where the first tile range is a range of a tile in which the spectrum of the high frequency band signal obtained through bandwidth extension processing needs to be adjusted. The high frequency band corresponding to the high frequency band signal includes the at least one tile, and the at least one tile includes the current tile.

If the current tile belongs to the first tile range, the adjusting, based on the information about the tonal component of the high frequency band signal, a spectrum of a high frequency band signal obtained through bandwidth extension processing, to obtain an adjusted spectrum of the high frequency band signal includes: adjusting the spectrum of the high frequency band signal in the current tile based on the information about the tonal component of the high frequency band signal, to obtain the adjusted spectrum of the high frequency band signal in the current tile.

Optionally, in the spectrum of the high frequency band signal obtained through bandwidth extension processing in the current tile, if a quantity of frequency bins whose absolute values of spectrum values are greater than a second threshold and less than a third threshold, the current tile belongs to the first tile range. That is, if a small quantity of reserved spectral components exist in the spectrum obtained through bandwidth extension processing in the current tile, a process of determining whether to perform spectrum adjustment may be performed.

For example, the second threshold is T, the third threshold is 10, the current tile is 5100 Hz to 5500 Hz, a quantity of frequency bins whose absolute values of spectrum values in the spectrum of the high frequency band signal obtained through bandwidth extension processing in the current tile is greater than T and less than 10, and the current tile being 5100 Hz to 5500 Hz belongs to the first tile range. It may be understood that a value of the third threshold may be another value, for example, 9 or 11. A specific value may be set based on experience or a requirement. In an implementation, a value of T may be set to three times an average value of the absolute values of spectrum values in the spectrum of the high frequency band signal obtained through bandwidth extension processing in the current tile (it should be noted that the three times is merely an example, and other manners may be used in actual application). For example, the value of T may be a positive real number such as 5.4, 6.6, or 9.0.

It should be understood that this step needs to be performed after step S820 and before step S840 in the method 800.

Therefore, before the spectrum of the high frequency band signal obtained through bandwidth extension processing is adjusted, based on the encoding rate of the current frame or the spectrum obtained through bandwidth extension in the current frame, the range of the tile in which whether to perform spectrum adjustment in the current frame needs to be determined is determined. This improves encoding efficiency.

In this embodiment of this application, when the current frame of the audio signal is encoded, a quantity of tiles in which spectrum reservation first policy or a quantity of tiles in which tone reconstruction first policy is used may be further determined based on the encoding rate of the current frame. The spectrum reservation first policy refers to performing third encoding on a spectrum reserved by the IGF in a tile in which the spectrum reservation first policy is used. The tone reconstruction first policy refers to removing a spectral component reserved by the IGF by adjusting, based on the information about the tonal component of the high frequency band signal obtained in the second encoding process, the spectrum of the high frequency band signal obtained through bandwidth extension processing.

The following further describes, by using two specific embodiments, that the quantity of tiles in which the spectrum reservation first is used or the quantity of tiles in which the tone reconstruction first is used is determined based on the encoding rate of the current frame.

In a specific embodiment, the quantity of tiles in which the spectrum reservation first is used is determined based on the encoding rate of the current frame.

If the total rate of the encoder is bitrate_tot and the quantity of channels is n_channels, the average encoding rate of each channel is bitrate_ch=bitrate_tot/n_channels. If the average encoding rate of each channel is less than or equal to a preset threshold, the spectrum reservation first policy is used only in a tile with a lower frequency, and the tone reconstruction first policy is used in a tile with a higher frequency. If the average encoding rate of each channel is greater than the preset threshold, the spectrum reservation first policy is used in all tiles of the entire high frequency band.

Pseudocode for specific implementation is as follows:

```
ifbitrate_ch > 24000
  num_tiles_encFirst = num_tiles spectrum reservation first
else
  num_tiles_encFirst = 1
end
```

num_tiles_encFirst is the quantity of tiles in which the spectrum reservation first policy is used, num_tiles is the total quantity of tiles of the high frequency band, and num_tiles_encFirst is equal to a minimum sequence number (the sequence number starts from 0) of a tile in which whether to adjust the spectrum obtained through bandwidth extension processing needs to be determined.

An adjustment manner of the spectrum obtained through bandwidth extension processing is as follows: In a tile in which the tone reconstruction first policy is used, a spectral component reserved by the IGF is removed (in other words, a spectrum value is set to 0), to achieve an objective that a reconstructed tonal component is mainly used in a spectrum of a high frequency band signal obtained through decoding.

Pseudocode for specific implementation is as follows:

```
for p = num_tiles_encFirst to num_tiles − 1
  if tone_cnt[p] > 0
    for sb = tile[p] to tile[p+1]−1
      mdctSpectrumAfterIGF[sb] = 0
    end
  end
end
```

num_tiles_encFirst is the quantity of tiles in which the spectrum reservation first policy is used, num_tiles is the total quantity of tiles of the high frequency band, num_tiles_encFirst is equal to the minimum sequence number (the sequence number starts from 0) of the tile in which whether to adjust the spectrum obtained through bandwidth extension processing needs to be determined, tone_cnt[p] is quantity information of a tonal component of a $p^{th}$ tile, tile[p] is a start frequency pin of the $p^{th}$ tile, tile[p+1] is a start frequency pin of a $(p+1)^{th}$ tile, tile [p+i]−1 is an end frequency bin of the $p^{th}$ tile, sb is a frequency bin index, and mdctSpectrumAfterIGF is the spectrum obtained through bandwidth extension processing, that is, the spectrum obtained through IGF processing.

In the other specific embodiment, the quantity of tiles in which the tone reconstruction first is used is determined based on the encoding rate of the current frame.

If the total rate of the encoder is bitrate_tot and the quantity of channels is n_channels, the average encoding rate of each channel is bitrate_ch=bitrate_tot/n_channels. If the average encoding rate of each channel is less than or equal to a preset threshold, the spectrum reservation first policy is used only in a tile with a lower frequency, and the tone reconstruction first policy is used in a tile with a higher frequency. If the average encoding rate of each channel is greater than the preset threshold, the spectrum reservation first policy is used in all tiles of the entire high frequency band.

Pseudocode for specific implementation is as follows:

```
if bitrate_ch > 24000
  num_tiles_reconFirst = 0
else
  num_tiles_reconFirst = 3 //the reconstruction first policy is used
for three tiles with high frequencies
end
```

num_tiles_reconFirst is the quantity of tiles in which the tone reconstruction first policy is used.

An adjustment manner of the spectrum obtained through bandwidth extension processing is as follows: In a tile in which the tone reconstruction first policy is used, a spectral component reserved by the IGF is removed (in other words, a spectrum value is set to 0), to achieve an objective that a reconstructed tonal component is mainly used in a spectrum of a high frequency band signal obtained through decoding.

Pseudocode for specific implementation is as follows:

```
for p = num_tiles − num_tiles reconFirst to num_tiles − 1
  if tone_cnt[p] > 0
    for sb = tile[p] to tile[p+l]−1
      mdctSpectrumAfterIGF[sb] = 0
    end
  end
end
```

num_tiles_reconFirst is the quantity of tiles in which the tone reconstruction first policy is used, num_tiles is the total quantity of tiles of the high frequency band, tone_cnt[p] is quantity information of a tonal component of a $p^{th}$ tile, tile[p] is a start frequency pin of the $p^{th}$ tile, tile[p+1] is a start frequency pin of a $(p+1)^{th}$ tile, tile [p+1]−1 is an end frequency bin of the $p^{th}$ tile, sb is a frequency bin index, and mdctSpectrumAfterIGF is the spectrum obtained through bandwidth extension processing, that is, the spectrum obtained through IGF processing.

The audio processing method in embodiments of this application is described in detail above with reference to FIG. 1 to FIG. 10. Apparatuses in embodiments of this application are described in detail below with reference to FIG. 11 to FIG. 13.

Figure 11:
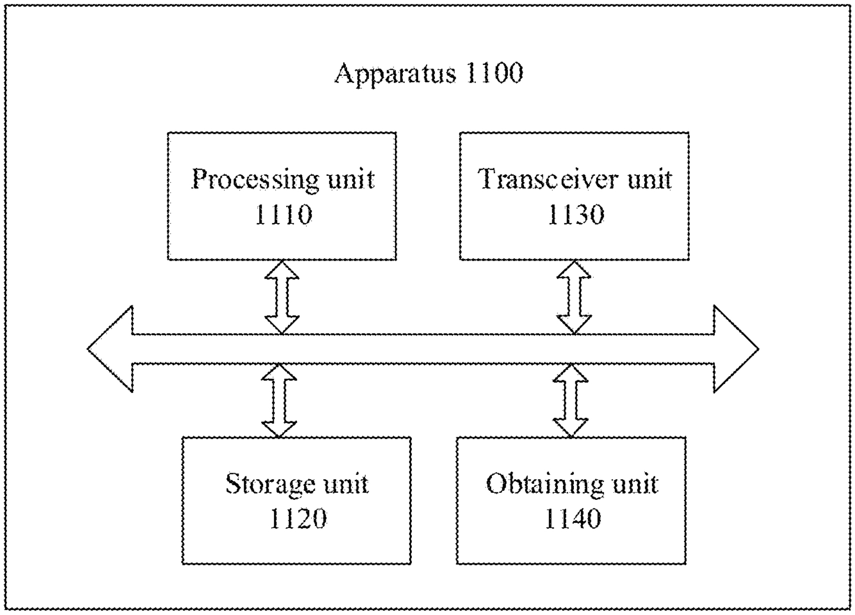
FIG. 11 is a schematic block diagram of a coding apparatus according to an embodiment of this application.

FIG. 11 is a schematic block diagram of a coding apparatus 1100 according to an embodiment of this application.

In some embodiments, the apparatus 1100 may be a terminal device, or may be a chip or a circuit, for example, a chip or a circuit that may be disposed in the terminal device.

In some embodiments, the apparatus 1100 may be an access network device, or may be a chip or a circuit, for example, a chip or a circuit that may be disposed in the access network device.

In some embodiments, the apparatus 1100 may be a core network device, or may be a chip or a circuit, for example, a chip or a circuit that may be disposed in the core network device.

In a possible manner, the apparatus 1100 may include a processing unit 1110 (that is, an example of a processor) and a transceiver unit 1130. In some possible implementations, the processing unit 1110 may also be referred to as a determining unit. In some possible implementations, the transceiver unit 1130 may include a receiving unit and a sending unit.

In an implementation, the transceiver unit 1130 may be implemented by using a transceiver, a transceiver-related circuit, or an interface circuit.

In an implementation, the apparatus may further include a storage unit 1120. In a possible manner, the storage unit 1120 is configured to store instructions. In an implementation, the storage unit may be further configured to store data or information. The storage unit 1120 may be implemented by using a memory.

In some possible designs, the processing unit 1110 is configured to execute the instructions stored in the storage unit 1120, to enable the apparatus 1100 to implement the steps performed by the terminal device in the foregoing method. Alternatively, the processing unit 1110 may be configured to invoke the data in the storage unit 1120, to enable the apparatus 1100 to implement the steps performed by the terminal device in the foregoing method.

In some possible designs, the processing unit 1110 is configured to execute the instructions stored in the storage unit 1120, to enable the apparatus 1100 to implement the steps performed by the access network device in the foregoing method. Alternatively, the processing unit 1110 may be configured to invoke the data in the storage unit 1120, to enable the apparatus 1100 to implement the steps performed by the access network device in the foregoing method.

For example, the processing unit 1110, the storage unit 1120, and the transceiver unit 1130 may communicate with each other through an internal connection path to transfer a control signal and/or a data signal. For example, the storage unit 1120 is configured to store a computer program. The processing unit 1110 may be configured to invoke the computer program from the storage unit 1120 and run the computer program, to control the transceiver unit 1130 to receive a signal and/or send a signal, to complete the steps performed by the terminal device or the access network device in the foregoing method. The storage unit 1120 may be integrated into the processing unit 1110, or may be disposed separately from the processing unit 1110.

Optionally, when the apparatus 1100 is a communication device (for example, the terminal device or the access network device), the transceiver unit 1130 includes a receiver and a transmitter. The receiver and the transmitter may be a same physical entity or different physical entities. When the receiver and the transmitter are a same physical entity, the receiver and the transmitter may be collectively referred to as a transceiver.

When the apparatus 1100 is the terminal device or the apparatus is the access network device or the core network device, the transceiver unit 1130 may be a sending unit or a transmitter when sending information, and the transceiver unit 1130 may be a receiving unit or a receiver when receiving information. The transceiver unit may be a transceiver. The transceiver, the transmitter, or the receiver may be a radio frequency circuit. When the apparatus includes the storage unit, the storage unit is configured to store computer instructions. The processor is communicatively connected to the memory. The processor executes the computer instructions stored in the memory, so that the apparatus can perform the method 800, the method 900, or the method 1000. The processor may be a general-purpose central processing unit (CPU), a microprocessor, or an application-specific integrated circuit (Application-Specific Integrated Circuit, ASIC).

Optionally, if the apparatus 1100 is a chip or a circuit, the transceiver unit 1130 includes an input interface and an output interface.

When the apparatus 1100 is a chip, the transceiver unit 1130 may be an input and/or output interface, a pin, a circuit, or the like. The processing unit 1110 may execute computer-executable instructions stored in the storage unit, so that the apparatus can perform the method 800, the method 900, or the method 1000. Optionally, the storage unit is a storage unit in the chip, for example, a register or a buffer, or the storage unit may be a storage unit in the terminal but outside the chip, for example, a read-only memory (ROM), another type of static storage device capable of storing static information and instructions, or a random access memory (RAM).

In an implementation, it may be considered that a function of the transceiver unit 1130 is implemented by using a transceiver circuit or a dedicated transceiver chip. It may be considered that the processing unit 1110 is implemented by using a dedicated processing chip, a processing circuit, a processing unit, or a general-purpose chip.

In another implementation, it may be considered that the coding device (for example, the terminal device or the access network device) provided in embodiments of this application is implemented by using a general-purpose computer. That is, program code for implementing functions of the processing unit 1110 and the transceiver unit 1130 is stored in the storage unit 1120, and a general-purpose processing unit implements the functions of the processing unit 1110 and the transceiver unit 1130 by executing the code in the storage unit 1120.

In some embodiments, the apparatus 1100 may be a coding device. When the apparatus 1100 is a coding device, or is disposed on a chip or a circuit of the coding device, an obtaining unit 1140 is configured to obtain a current frame of an audio signal, where the current frame of the audio signal includes a high frequency band signal and a low frequency band signal. The processing unit 1110 is configured to perform first encoding based on the high frequency band signal and the low frequency band signal, to obtain a first encoding parameter of the current frame of the audio signal, where the first encoding includes bandwidth extension encoding. The processing unit 1110 is further configured to perform second encoding based on the high frequency band signal to obtain a second encoding parameter of the current frame, where the second encoding parameter indicates information about a tonal component of the high frequency band signal. The processing unit 1110 is further configured to adjust, based on the information about the tonal component of the high frequency band signal, a spectrum of a high frequency band signal obtained through bandwidth extension processing, to obtain an adjusted spectrum of the high frequency band signal, where the spectrum of the high frequency band signal obtained through bandwidth extension processing is obtained in a bandwidth extension encoding process. The processing unit 1110 is further configured to perform third encoding based on the adjusted spectrum of the high frequency band signal to obtain a third encoding parameter. The processing unit 1110 is further configured to perform bitstream multiplexing on the first encoding parameter, the second encoding parameter, and the third encoding parameter to obtain an encoded bitstream of the current frame of the audio signal.

Optionally, the information about the tonal component includes at least one or more of the following parameters: flag information of the tonal component, location information of the tonal component, quantity information of the tonal component, amplitude information of the tonal component, or energy information of the tonal component.

Optionally, a high frequency band corresponding to the high frequency band signal includes at least one tile, and the at least one tile includes a current tile. The processing unit 1110 is specifically configured to: adjust, based on quantity information of a tonal component in the current tile, a spectrum of a high frequency band signal obtained through bandwidth extension processing in the current tile, to obtain an adjusted spectrum of the high frequency band signal in the current tile.

Optionally, the processing unit 1110 is specifically configured to: if the quantity information of the tonal component in the current tile meets a first preset condition, adjust the spectrum of the high frequency band signal obtained through bandwidth extension processing in the current tile, to obtain the adjusted spectrum of the high frequency band signal in the current tile.

Optionally, the first preset condition is that a quantity of tonal components in the current tile is greater than or equal to a first threshold.

Optionally, a high frequency band corresponding to the high frequency band signal includes at least one tile, and the at least one tile includes a current tile. The processing unit 1110 is specifically configured to: adjust, based on flag information of a tonal component in the current tile, a spectrum of a high frequency band signal obtained through bandwidth extension processing in the current tile, to obtain an adjusted spectrum of the high frequency band signal in the current tile, where the flag information of the tonal component indicates whether the tonal component exists in the current tile.

Optionally, the processing unit 1110 is specifically configured to: if a value of the flag information of the tonal component in the current tile is a first preset value, adjust the spectrum of the high frequency band signal obtained through bandwidth extension processing in the current tile, to obtain the adjusted spectrum of the high frequency band signal in the current tile. The value of the flag information of the tonal component in the current tile equal to the first preset value indicates that the tonal component exists in the current tile.

Optionally, the processing unit 1110 is specifically configured to: set a value of the spectrum of the high frequency band signal obtained through bandwidth extension processing in the current tile to a second preset value; or weight the spectrum of the high frequency band signal obtained through bandwidth extension processing in the current tile, to obtain the adjusted spectrum of the high frequency band signal in the current tile.

Optionally, a high frequency band corresponding to the high frequency band signal includes at least one tile, and the at least one tile includes a current tile. The processing unit 1110 is specifically configured to: adjust, based on location information of a tonal component in the current tile, a spectrum of a high frequency band signal obtained through bandwidth extension processing in the current tile, to obtain an adjusted spectrum of the high frequency band signal in the current tile.

Optionally, the current tile includes at least one subband, and the at least one subband includes a current subband. The processing unit 1110 is specifically configured to: if the location information of the tonal component in the current tile meets a second preset condition, adjust a spectrum of a high frequency band signal obtained through bandwidth extension processing in the current subband, to obtain an adjusted spectrum of the high frequency band signal in the current subband.

Optionally, the location information of the tonal component in the current tile includes an index of a subband including the tonal component in the current tile, and the second preset condition is that the index of the subband including the tonal component includes an index of the current subband.

Optionally, the processing unit 1110 is specifically configured to: set a value of the spectrum of the high frequency band signal obtained through bandwidth extension processing in the current subband to a second preset value, to obtain the adjusted spectrum of the high frequency band signal in the current subband; or weight the spectrum of the high frequency band signal obtained through bandwidth extension processing in the current subband, to obtain the adjusted spectrum of the high frequency band signal in the current subband.

Optionally, the processing unit 1110 is further configured to: before adjusting, based on the information about the tonal component of the high frequency band signal, the spectrum of the high frequency band signal obtained through bandwidth extension processing, to obtain the adjusted spectrum of the high frequency band signal, determine a start tile based on an encoding rate of the current frame, where the start tile is a tile with a smallest index in a frequency range in which whether to adjust the spectrum of the high frequency band signal obtained through bandwidth extension processing needs to be determined. The adjusting, based on the information about the tonal component of the high frequency band signal, a spectrum of a high frequency band signal obtained through bandwidth extension processing, to obtain an adjusted spectrum of the high frequency band signal includes: adjusting, based on the information about the tonal component of the high frequency band signal from the start tile, the spectrum of the high frequency band signal obtained through bandwidth extension processing, to obtain the adjusted spectrum of the high frequency band signal.

Optionally, the processing unit 1110 is specifically configured to: if the encoding rate of the current frame meets a third preset condition, the start tile is a first start tile; or if the encoding rate of the current frame does not meet a third preset condition, the start tile is a second start tile, where a frequency range corresponding to the first start tile is different from a frequency range corresponding to the second start tile.

Optionally, the processing unit 1110 is further configured to: before adjusting, based on the information about the tonal component of the high frequency band signal, the spectrum of the high frequency band signal obtained through bandwidth extension processing, to obtain the adjusted spectrum of the high frequency band signal, determine a first tile range based on an encoding rate of the current frame, where the first tile range is a range of a tile in which whether to adjust the spectrum of the high frequency band signal obtained through bandwidth extension processing needs to be determined. The adjusting, based on the information about the tonal component of the high frequency band signal, a spectrum of a high frequency band signal obtained through bandwidth extension processing, to obtain an adjusted spectrum of the high frequency band signal includes: adjusting, in the first tile range based on the information about the tonal component of the high frequency band signal, the spectrum of the high frequency band signal obtained through bandwidth extension processing, to obtain the adjusted spectrum of the high frequency band signal.

Optionally, the processing unit 1110 is specifically configured to: if the encoding rate of the current frame meets a third preset condition, the first tile range is a first range; or if the encoding rate of the current frame does not meet a third preset condition, the first tile range is a second range, where a frequency range corresponding to the first range is not completely the same as a frequency range corresponding to the second range.

Optionally, the high frequency band corresponding to the high frequency band signal includes the at least one tile, and the at least one tile includes the current tile. The processing unit 1110 is further configured to: before adjusting, based on the information about the tonal component of the high frequency band signal, the spectrum of the high frequency band signal obtained through bandwidth extension processing, to obtain the adjusted spectrum of the high frequency band signal, determine whether the current tile belongs to a first tile range based on the spectrum of the high frequency band signal obtained through bandwidth extension processing in the current tile, where the first tile range is a range of a tile in which whether to adjust the spectrum of the high frequency band signal obtained through bandwidth extension processing needs to be determined. If the current tile belongs to the first tile range, the processing unit is further configured to adjust the spectrum of the high frequency band signal in the current tile based on the information about the tonal component of the high frequency band signal, to obtain the adjusted spectrum of the high frequency band signal in the current tile.

Optionally, the processing unit 1110 is specifically configured to: in the spectrum of the high frequency band signal obtained through bandwidth extension processing in the current tile, if a quantity of frequency bins whose absolute values of spectrum values are greater than a second threshold and less than a third threshold, the current tile belongs to the first tile range.

Optionally, the obtaining unit 1140 is further configured to obtain an encoded bitstream. The processing unit 1110 is further configured to perform bitstream demultiplexing on the encoded bitstream to obtain a first encoding parameter, a second encoding parameter, and a third encoding parameter of a current frame of an audio signal. The processing unit 1110 is further configured to obtain a first high frequency band signal of the current frame and a first low frequency band signal of the current frame based on the first encoding parameter and the third encoding parameter, where the first high frequency band signal includes at least one of a decoded high frequency band signal obtained through direct decoding based on the first encoding parameter and the third encoding parameter, and an extended high frequency band signal obtained through bandwidth extension based on the first low frequency band signal. The processing unit 1110 is further configured to obtain a second high frequency band signal of the current frame based on the second encoding parameter, where the second high frequency band signal includes a reconstructed tonal signal. The processing unit 1110 is further configured to obtain a decoded signal of the current frame based on the first low frequency band signal, the first high frequency band signal, and the second high frequency band signal of the current frame.

When the apparatus 1100 is configured in a coding device or is a coding device, modules or units in the apparatus 1100 may be configured to perform actions or processing processes performed by the coding device in the foregoing method. To avoid repetition, detailed description thereof is omitted herein.

Figure 12:
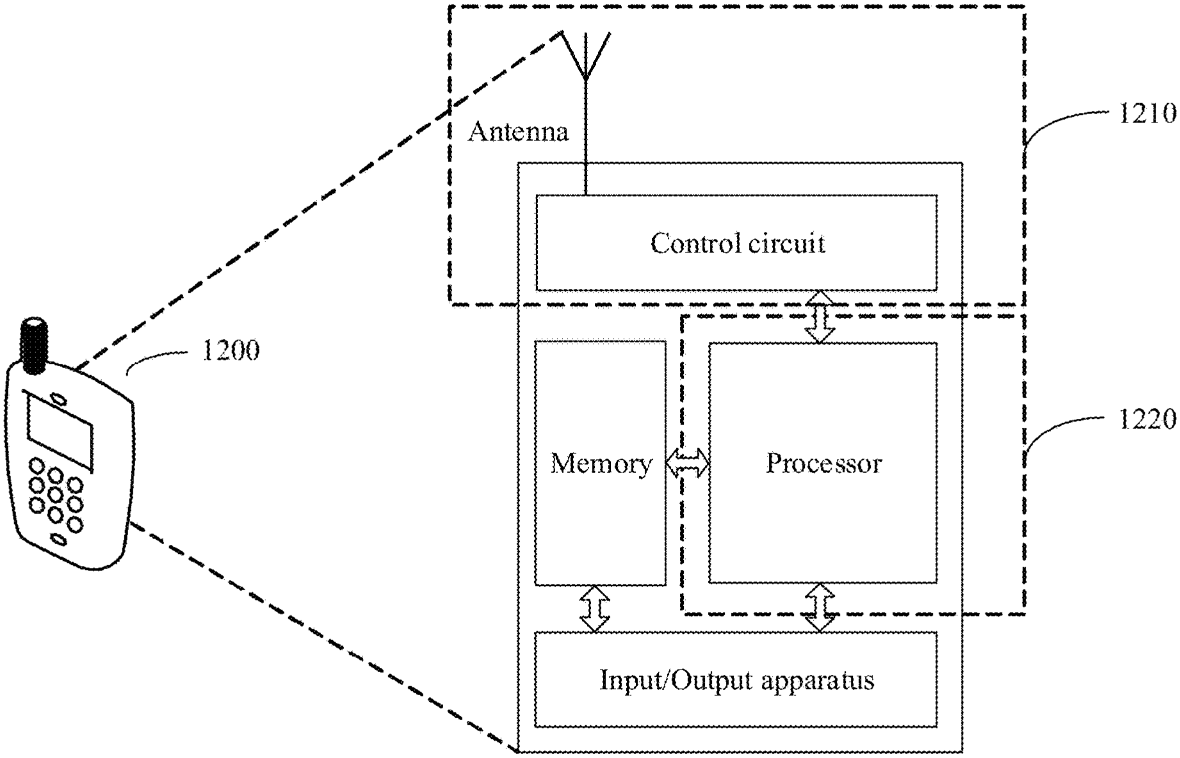
FIG. 12 is a schematic diagram of a structure of a terminal device according to this application.

FIG. 12 is a schematic diagram of a structure of a terminal device 1200 according to this application. The terminal device 1200 may perform the actions performed by the terminal device in the foregoing method embodiments.

For ease of description, FIG. 12 shows only main components of the terminal device. As shown in FIG. 12, the terminal device 1200 includes a processor, a memory, a control circuit, an antenna, and an input/output apparatus.

The processor is mainly configured to process a communication protocol and communication data, control the entire terminal device, execute a software program, and process data of the software program. For example, the processor is configured to support the terminal device to perform the actions described in the foregoing embodiments of the audio processing method. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to receive/send a radio frequency signal in a form of an electromagnetic wave. The input/output apparatus, such as a touchscreen, a display screen, or a keyboard, is mainly configured to: receive data input by a user and output data to the user.

After the terminal device is powered on, the processor may read the software program in the storage unit, interpret and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in a form of electromagnetic wave. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 12 shows only one memory and one processor. In an actual terminal device, there may be a plurality of processors and memories. The memory may also be referred to as a storage medium, a storage device, or the like. This is not limited in embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit are integrated into the processor in FIG. 12. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna and the control circuit that have a transceiver function may be considered as a transceiver unit 1210 of the terminal device 1200, and the processor that has a processing function may be considered as a processing unit 1220 of the terminal device 1200. The processing unit 1220 may also implement a function of the obtaining unit. As shown in FIG. 12, the terminal device 1200 includes the transceiver unit 1210 and the processing unit 1220. The transceiver unit may also be referred to as a transceiver, a transceiver machine, a transceiver apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. That is, the transceiver unit includes the receiving unit and the sending unit. For example, the receiving unit may also be referred to as a receiver, a receive machine, or a receiving circuit, and the sending unit may also be referred to as a transmitter, a transmit machine, or a transmitting circuit.

Figure 13:
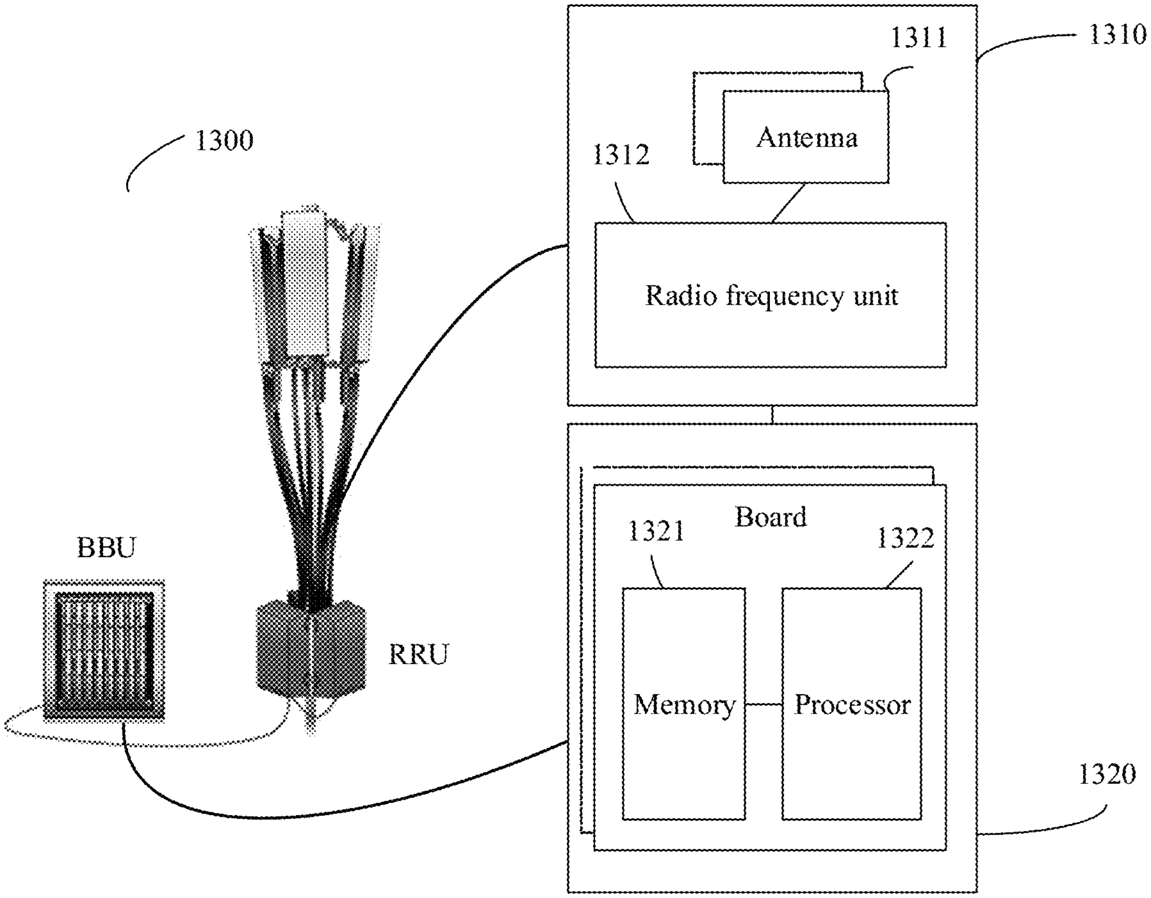
FIG. 13 is a schematic diagram of a structure of an access network device according to an embodiment of this application.

FIG. 13 is a schematic diagram of a structure an access network device 1300 according to an embodiment of this application. The access network device 1300 may be configured to implement a function of the access device in the foregoing methods. The access network device 1300 includes one or more radio frequency units such as a remote radio unit (RRU) 1313 and one or more baseband units (BBU) (which may also be referred to as a digital unit, (DU)) 1320. The RRU 1313 may be referred to as a transceiver unit, a transceiver machine, a transceiver circuit, a transceiver, or the like, and may include at least one antenna 1311 and a radio frequency unit 1312. The RRU 1313 part is mainly configured to: send/receive a radio frequency signal and perform conversion between the radio frequency signal and a baseband signal, for example, is configured to send the signaling message in the foregoing embodiments to a terminal device. The BBU 1320 part is mainly configured to perform baseband processing, control a base station, and the like. The RRU 1313 and the BBU 1320 may be physically deployed together, or may be physically separated, that is, a distributed base station.

The BBU 1320 is a control center of the base station, may also be referred to as a processing unit, and is mainly configured to implement a baseband processing function, for example, channel coding, multiplexing, modulation, and spreading. For example, the BBU (the processing unit) 1320 may be configured to control the access network device to perform an operation procedure related to the access network device in the foregoing method embodiments.

In an example, the BBU 1320 may include one or more boards, and a plurality of boards may jointly support a radio access network (for example, an LTE system, a 5G system, or a future radio access network system) of a single access standard, or may support radio access networks of different access standards. The BBU 1320 further includes a memory 1321 and a processor 1322. The memory 1321 is configured to store necessary instructions and data. For example, the memory 1321 stores a codebook in the foregoing embodiments. The processor 1322 is configured to control the base station to perform a necessary action, for example, is configured to control the base station to perform an operation procedure related to the network device in the foregoing method embodiments. The memory 1321 and the processor 1322 may serve the one or more boards. In other words, a memory and a processor may be disposed on each board. Alternatively, a plurality of boards may share a same memory and a same processor. In addition, a necessary circuit may further be disposed on each board.

In a possible implementation, with development of a system-on-chip (system-on-chip, SoC) technology, all or some functions of the part 1320 and the part 1313 may be implemented using the SoC technology, for example, implemented by using a base station function chip. The base station function chip integrates components such as a processor, a memory, and an antenna port. A program of a base station-related function is stored in the memory. The processor executes the program to implement the base station-related function. Optionally, the base station function chip can alternatively read an external memory of the chip, to implement the base station-related function.

It should be understood that the structure of the access network device shown in FIG. 13 is merely a possible form, and should not constitute any limitation on embodiments of this application. This application does not exclude a possibility that a base station structure of another form may appear in the future.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example rather than a limitative description, random access memories (RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedures or functions according to embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a computer-readable medium, where the computer-readable medium stores a computer program. When the computer program is executed by a computer, steps performed by the coding device in any one of the foregoing embodiments are implemented.

An embodiment of this application further provides a computer program product. When the computer program product is executed by a computer, steps performed by the coding device in any one of the foregoing embodiments are implemented.

An embodiment of this application further provides a system chip. The system chip includes a communication unit and a processing unit. The processing unit may be, for example, a processor. The communication unit may be, for example, a communication interface, an input/output interface, a pin, or a circuit. The processing unit may execute computer instructions, so that a chip in the system chip performs the steps performed by the coding device provided in the foregoing embodiments of this application.

Optionally, the computer instructions are stored in a storage unit.

An embodiment of this application further provides a computer-readable storage medium. The computer-readable storage medium stores an encoded bitstream obtained according to the method performed by the coding device in any one of the foregoing embodiments.

Embodiments in this application may be used independently, or may be used jointly. This is not limited herein.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

It should be understood that the term "and/or" describes an association relationship between associated objects, and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions to enable a computer device (which may be a personal computer, a server, a network device, or the like) to perform all or some of the steps of the method described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio encoding method, comprising:

obtaining a current frame of an audio signal, wherein the current frame of the audio signal comprises a high frequency band signal and a low frequency band signal;

performing first encoding based on the high frequency band signal and the low frequency band signal, to obtain a first encoding parameter of the current frame of the audio signal, wherein the first encoding comprises bandwidth extension encoding;

performing second encoding based on the high frequency band signal to obtain a second encoding parameter of the current frame, wherein the second encoding parameter indicates information about a tonal component of the high frequency band signal;

obtaining the high frequency band signal through bandwidth extension processing;

obtaining a spectrum of the high frequency band signal in the bandwidth extension encoding;

adjusting, based on the information about the tonal component of the high frequency band signal, the spectrum of the high frequency band signal, to obtain an adjusted spectrum of the high frequency band signal;

performing third encoding based on the adjusted spectrum of the high frequency band signal to obtain a third encoding parameter; and performing bitstream multiplexing on the first encoding parameter, the second encoding parameter, and the third encoding parameter to obtain an encoded bitstream of the current frame of the audio signal.

2. The method according to claim 1, wherein the information about the tonal component comprises one or more of the following parameters:

flag information of the tonal component, location information of the tonal component, quantity information of the tonal component, amplitude information of the tonal component, or energy information of the tonal component.

3. The method according to claim 2, wherein a high frequency band corresponding to the high frequency band signal comprises at least one tile, and the at least one tile comprises a current tile; and when the information about the tonal component comprises the quantity information of the tonal component, the adjusting, based on the information about the tonal component of the high frequency band signal, the spectrum of the high frequency band signal, to obtain the adjusted spectrum of the high frequency band signal comprises:

adjusting, based on the quantity information of the tonal component in the current tile, the spectrum of the high frequency band signal in the current tile, to obtain the adjusted spectrum of the high frequency band signal in the current tile;

or when the information about the tonal component comprises the location information of the tonal component, the adjusting, based on the information about the tonal component of the high frequency band signal, the spectrum of the high frequency band signal, to obtain the adjusted spectrum of the high frequency band signal comprises:

adjusting, based on location information of a tonal component in the current tile, the spectrum of the high frequency band signal in the current tile, to obtain the adjusted spectrum of the high frequency band signal in the current tile;

or when the information about the tonal component comprises the flag information of the tonal component, the adjusting, based on the information about the tonal component of the high frequency band signal, the spectrum of the high frequency band signal, to obtain the adjusted spectrum of the high frequency band signal comprises:

adjusting, based on flag information of a tonal component in the current tile, the spectrum of the high frequency band signal in the current tile, to obtain the adjusted spectrum of the high frequency band signal in the current tile, wherein the flag information of the tonal component indicates whether the tonal component exists in the current tile.

4. The method according to claim 3, wherein the information about the tonal component comprises the quantity information of the tonal component, and the adjusting, based on quantity information of the tonal component in the current tile, the spectrum of the high frequency band signal in the current tile, to obtain the adjusted spectrum of the high frequency band signal in the current tile comprises:

in response to the quantity information of the tonal component in the current tile meeting a first preset condition, adjusting the spectrum of the high frequency band signal in the current tile, to obtain the adjusted spectrum of the high frequency band signal in the current tile.

5. The method according to claim 4, wherein the first preset condition is that a quantity of tonal components in the current tile is greater than or equal to a first threshold.

6. The method according to claim 3, wherein the information about the tonal component comprises the flag information of the tonal component, and the adjusting, based on flag information of the tonal component in the current tile, the spectrum of the high frequency band signal in the current tile, to obtain the adjusted spectrum of the high frequency band signal in the current tile comprises:

in response to a value of the flag information of the tonal component in the current tile being a first preset value, adjusting the spectrum of the high frequency band signal in the current tile, to obtain the adjusted spectrum of the high frequency band signal in the current tile, wherein the value of the flag information of the tonal component in the current tile equal to the first preset value indicates that the tonal component exists in the current tile.

7. The method according to claim 3, wherein the adjusting the spectrum of the high frequency band signal obtained through bandwidth extension processing in the current tile, to obtain the adjusted spectrum of the high frequency band signal in a current tile comprises:

setting a value of the spectrum of the high frequency band signal in the current tile to a second preset value, to obtain the adjusted spectrum of the high frequency band signal in the current tile; or weighting the spectrum of the high frequency band signal in the current tile, to obtain the adjusted spectrum of the high frequency band signal in the current tile.

8. The method according to claim 3, wherein the current tile comprises at least one subband, and the at least one subband comprises a current subband, and the information about the tonal component comprises the location information of the tonal component; and the adjusting, based on location information of the tonal component in the current tile, the spectrum of the high frequency band signal in the current tile, to obtain the adjusted spectrum of the high frequency band signal in the current tile comprises:

in response to the location information of the tonal component in the current tile meeting a second preset condition, adjusting the spectrum of the high frequency band signal in the current subband, to obtain the adjusted spectrum of the high frequency band signal in the current subband.

9. The method according to claim 8, wherein the location information of the tonal component in the current tile comprises a subband index of a subband comprising the tonal component in the current tile, and the second preset condition is that the subband index of the subband comprising the tonal component comprises an index of the current subband.

10. The method according to claim 8, wherein the adjusting the spectrum of the high frequency band signal in the current subband, to obtain the adjusted spectrum of the high frequency band signal in the current subband comprises:

setting a value of the spectrum of the high frequency band signal in the current subband to a second preset value, to obtain the adjusted spectrum of the high frequency band signal in the current tile; or weighting the spectrum of the high frequency band signal in the current subband, to obtain the adjusted spectrum of the high frequency band signal in the current subband.

11. An apparatus comprising:

at least one processor; and one or more memories coupled to the at least one processor and storing programming instructions for execution by the at least one processor configured to cause the apparatus to:

obtain a current frame of an audio signal, wherein the current frame of the audio signal comprises a high frequency band signal and a low frequency band signal;

perform first encoding based on the high frequency band signal and the low frequency band signal, to obtain a first encoding parameter of the current frame of the audio signal, wherein the first encoding comprises bandwidth extension encoding;

perform second encoding based on the high frequency band signal to obtain a second encoding parameter of the current frame, wherein the second encoding parameter indicates information about a tonal component of the high frequency band signal;

obtain the high frequency band signal through bandwidth extension processing;

obtain a spectrum of the high frequency band signal in the bandwidth extension encoding;

adjust, based on the information about the tonal component of the high frequency band signal, the spectrum of the high frequency band signal, to obtain an adjusted spectrum of the high frequency band signal;

perform third encoding based on the adjusted spectrum of the high frequency band signal to obtain a third encoding parameter; and perform bitstream multiplexing on the first encoding parameter, the second encoding parameter, and the third encoding parameter to obtain an encoded bitstream of the current frame of the audio signal.

12. The apparatus according to claim 11, wherein the information about the tonal component comprises one or more of the following parameters:

flag information of the tonal component, location information of the tonal component, quantity information of the tonal component, amplitude information of the tonal component, or energy information of the tonal component.

13. The apparatus according to claim 12, wherein a high frequency band corresponding to the high frequency band signal comprises at least one tile, and the at least one tile comprises a current tile; and when the information about the tonal component comprises the quantity information of the tonal component, the programming instructions for execution by the at least one processor are configured to cause the apparatus further to:

adjust, based on the quantity information of the tonal component in the current tile, the spectrum of the high frequency band signal in the current tile, to obtain the adjusted spectrum of the high frequency band signal in the current tile;

or when the information about the tonal component comprises the location information of the tonal component, the programming instructions for execution by the at least one processor are configured to cause the apparatus further to:

adjust, based on location information of a tonal component in the current tile, the spectrum of the high frequency band signal in the current tile, to obtain the adjusted spectrum of the high frequency band signal in the current tile;

or when the information about the tonal component comprises the flag information of the tonal component, the programming instructions for execution by the at least one processor are configured to cause the apparatus further to:

adjust, based on flag information of a tonal component in the current tile, the spectrum of the high frequency band signal in the current tile, to obtain the adjusted spectrum of the high frequency band signal in the current tile, wherein the flag information of the tonal component indicates whether the tonal component exists in the current tile.

14. The apparatus according to claim 13, wherein when the quantity information of the tonal component in the current tile meets a first preset condition, the programming instructions for execution by the at least one processor to cause the apparatus further to:

adjust the spectrum of the high frequency band signal in the current tile, to obtain the adjusted spectrum of the high frequency band signal in the current tile.

15. The apparatus according to claim 14, wherein the first preset condition is that a quantity of tonal components in the current tile is greater than or equal to a first threshold.

16. The apparatus according to claim 13, wherein the information about the tonal component comprises the flag information of the tonal component, and when a value of the flag information of the tonal component in the current tile is a first preset value, the programming instructions for execution by the at least one processor to cause the apparatus further to:

adjust the spectrum of the high frequency band signal in the current tile, to obtain the adjusted spectrum of the high frequency band signal in the current tile, wherein the value of the flag information of the tonal component in the current tile equal to the first preset value indicates that the tonal component exists in the current tile.

17. The apparatus according to claim 13, wherein the programming instructions for execution by the at least one processor are configured to cause the apparatus further to:

set a value of the spectrum of the high frequency band signal in the current tile to a second preset value, to obtain the adjusted spectrum of the high frequency band signal in the current tile; or weight the spectrum of the high frequency band signal in the current tile, to obtain the adjusted spectrum of the high frequency band signal in the current tile.

18. The apparatus according to claim 13, wherein the current tile comprises at least one subband, and the at least one subband comprises a current subband; and the information about the tonal component comprises the location information of the tonal component, when the location information of the tonal component in the current tile meets a second preset condition, the programming instructions for execution by the at least one processor are configured to cause the apparatus further to:

adjust the spectrum of the high frequency band signal in the current subband, to obtain the adjusted spectrum of the high frequency band signal in the current subband.

19. The apparatus according to claim 18, wherein the location information of the tonal component in the current tile comprises a subband index of a subband comprising the tonal component in the current tile, and the second preset condition is that the subband index of the subband comprising the tonal component comprises an index of the current subband.

20. The apparatus according to claim 18, wherein the programming instructions for execution by the at least one processor are configured to cause the apparatus further to:

set a value of the spectrum of the high frequency band signal in the current subband to a second preset value, to obtain the adjusted spectrum of the high frequency band signal in the current tile; or weight the spectrum of the high frequency band signal in the current subband, to obtain the adjusted spectrum of the high frequency band signal in the current subband.

21. A non-transitory computer readable storage medium, tangibly embodying computer program code, which, when executed by a computer unit, causes the computer unit to perform a method comprising:

obtaining a current frame of an audio signal, wherein the current frame of the audio signal comprises a high frequency band signal and a low frequency band signal;

performing first encoding based on the high frequency band signal and the low frequency band signal, to obtain a first encoding parameter of the current frame of the audio signal, wherein the first encoding comprises bandwidth extension encoding;

performing second encoding based on the high frequency band signal to obtain a second encoding parameter of the current frame, wherein the second encoding parameter indicates information about a tonal component of the high frequency band signal;

obtaining the high frequency band signal through bandwidth extension processing;

obtaining a spectrum of the high frequency band signal in the bandwidth extension encoding;

adjusting, based on the information about the tonal component of the high frequency band signal, the spectrum of the high frequency band signal, to obtain an adjusted spectrum of the high frequency band signal;

performing third encoding based on the adjusted spectrum of the high frequency band signal to obtain a third encoding parameter; and performing bitstream multiplexing on the first encoding parameter, the second encoding parameter, and the third encoding parameter to obtain an encoded bitstream of the current frame of the audio signal.

* * * * *